(12) United States Patent
Nakamura et al.

(10) Patent No.: US 11,008,084 B2
(45) Date of Patent: May 18, 2021

(54) HYBRID TYPE VESSEL PROPULSION APPARATUS

(71) Applicant: YAMAHA HATSUDOKI KABUSHIKI KAISHA, Iwata (JP)

(72) Inventors: Daisuke Nakamura, Shizuoka (JP); Takayoshi Suzuki, Shizuoka (JP); Masamichi Fujiwara, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 57 days.

(21) Appl. No.: 16/535,184

(22) Filed: Aug. 8, 2019

(65) Prior Publication Data
US 2020/0062362 A1 Feb. 27, 2020

(30) Foreign Application Priority Data
Aug. 23, 2018 (JP) .............................. JP2018-156134

(51) Int. Cl.
*B63H 20/00* (2006.01)
*B62K 5/05* (2013.01)
*B60K 6/46* (2007.10)
*B63H 23/06* (2006.01)
*B60K 6/26* (2007.10)
*B63H 21/21* (2006.01)
*B63H 21/20* (2006.01)

(52) U.S. Cl.
CPC .............. *B63H 21/26* (2013.01); *B60K 6/26* (2013.01); *B60K 6/46* (2013.01); *B62K 5/05* (2013.01); *B63H 23/06* (2013.01); *B63H 2021/202* (2013.01); *B63H 2021/216* (2013.01)

(58) Field of Classification Search
CPC .............. B63H 21/20; B63H 2021/202; B63H 2021/205; B63H 2021/216; B63H 21/26; B63H 23/06; B63H 23/30; B60K 6/26; B60K 6/46; Y02T 70/523
See application file for complete search history.

(56) References Cited

U.S. PATENT DOCUMENTS

| 7,042,128 | B2 * | 5/2006 | Zepp .................... H02K 21/222 310/191 |
| 7,862,393 | B2 * | 1/2011 | Levander ............... B63H 23/30 440/3 |
| 9,428,256 | B2 * | 8/2016 | Lee ......................... B63H 21/17 |

(Continued)

FOREIGN PATENT DOCUMENTS

| DE | 11 2016 004 811 T5 | 8/2018 |
| JP | 2017-218016 A | 12/2017 |
| WO | 2006/095042 A1 | 9/2006 |

*Primary Examiner* — Ajay Vasudeva
(74) *Attorney, Agent, or Firm* — Keating and Bennett, LLP

(57) ABSTRACT

A hybrid type vessel propulsion apparatus includes an engine, an electric motor, a propeller shaft that rotates together with a propeller, a first transmission path, a second transmission path, and a third transmission path. The first transmission path transmits power of the engine to the propeller shaft. The second transmission path transmits power of the electric motor to the propeller shaft without transmitting the power through the first transmission path. The third transmission path transmits a portion of the power of the engine, which has been transmitted from the first transmission path to the propeller shaft, to the electric motor in order for the electric motor to generate electricity.

7 Claims, 12 Drawing Sheets

(56) References Cited

U.S. PATENT DOCUMENTS

| | | | |
|---|---|---|---|
| 9,586,666 B2* | 3/2017 | Hedlund | B63H 23/08 |
| 10,442,517 B2* | 10/2019 | Miyamae | F16H 57/04 |
| 2017/0349256 A1 | 12/2017 | Nakamura | |
| 2018/0312236 A1 | 11/2018 | Miyamae et al. | |

* cited by examiner

HYBRID TYPE VESSEL PROPULSION APPARATUS

CROSS REFERENCE TO RELATED APPLICATIONS

This application claims the benefit of priority to Japanese Patent Application No. 2018-156134 filed on Aug. 23, 2018. The entire contents of this application are hereby incorporated herein by reference.

BACKGROUND OF THE INVENTION

1. Field of the Invention

The present invention relates to a hybrid type vessel propulsion apparatus that is powered by an engine and an electric motor.

2. Description of the Related Art

A vessel propulsion apparatus disclosed in Japanese Patent Application Publication No. 2017-218016 includes an outboard motor and a suspension device by which the outboard motor is attached to a hull. This vessel propulsion apparatus is a hybrid type, and the outboard motor includes a propeller, and an engine and an electric motor that generate power by which the propeller is rotated.

In the hybrid type vessel propulsion apparatus disclosed in Japanese Patent Application Publication No. 2017-218016, a voltage necessary for the operation of the electric motor that rotates the propeller is higher than a voltage necessary for the operation of an auxiliary in the vessel propulsion apparatus. When the operational power of the electric motor is supplied by an existing electric distribution system in the vessel propulsion apparatus, a major structural change is needed in the existing electric distribution system.

SUMMARY OF THE INVENTION

In order to overcome the previously unrecognized and unsolved challenges described above, preferred embodiments of the present invention provide hybrid type vessel propulsion apparatuses that each includes an engine, an electric motor, a propeller shaft that rotates together with a propeller, a first transmission path, a second transmission path, and a third transmission path. The first transmission path transmits power of the engine to the propeller shaft. The second transmission path transmits power of the electric motor to the propeller shaft without transmitting the power through the first transmission path. The third transmission path transmits a portion of the power of the engine, which has been transmitted from the first transmission path to the propeller shaft, to the electric motor in order for the electric motor to generate electricity.

According to this structural arrangement, the propeller shaft rotates by the power of the engine when the power of the engine is transmitted to the propeller shaft through the first transmission path. The mode of the hybrid type vessel propulsion apparatus at this time is referred to as an engine drive mode. The propeller shaft rotates by the power of the electric motor when the power of the electric motor is transmitted to the propeller shaft through the second transmission path. The mode of the hybrid type vessel propulsion apparatus at this time is referred to as an electric motor drive mode. The hybrid type vessel propulsion apparatus is in an engine-drive-plus-electric-motor-generation mode when a portion of the power of the engine, which has been transmitted from the first transmission path to the propeller shaft, is transmitted to the electric motor through the third transmission path. In other words, the electric motor generates electricity while the propeller shaft is rotating by the power of the engine. The electric power generated by the electric motor at this time has a higher voltage than the electric power generated by the existing electric distribution system in the hybrid type vessel propulsion apparatus, and is used to operate the electric motor in the subsequent electric motor drive mode. In other words, the electric motor that rotates the propeller generates the operational power of the electric motor. This makes it possible to provide the operational power of the electric motor without making a major structural change in the existing electric distribution system.

In a preferred embodiment of the present invention, the hybrid type vessel propulsion apparatus additionally includes a power source that supplies operational power to the electric motor and that is charged with electric power generated by the electric motor. According to this structural arrangement, the power source is charged with electric power generated by the electric motor in the engine-drive-plus-electric-motor-generation mode. Therefore, it is possible to store the operational power of the electric motor in the power source without making a major structural change in the existing electric distribution system.

In a preferred embodiment of the present invention, the hybrid type vessel propulsion apparatus additionally includes a first clutch, a second clutch, and a switch. The first clutch includes a first cut-off state in which power transmission of the first transmission path is cut off and a first connection state in which the power transmission of the first transmission path is permitted. The second clutch includes a second cut-off state, a second connection state, and a third connection state. When the second clutch is in the second cut-off state, both power transmission of the second transmission path and power transmission of the third transmission path is cut off. When the second clutch is in the second connection state, the power transmission of the third transmission path is cut off, while permitting the power transmission of the second transmission path. When the second clutch is in the third connection state, the power transmission of the second transmission path is cut off while permitting the power transmission of the third transmission path. The switch is able to switch the first clutch from the first cut-off state to the first connection state, and switch the second clutch from the second connection state to the second cut-off state. The switch is able to switch the second clutch between the second cut-off state and the third connection state while the first connection state of the first clutch is being maintained. The switch is able to switch the first clutch from the first connection state to the first cut-off state, and switch the second clutch from the second cut-off state to the second connection state. When the first clutch is in the first cut-off state and the second clutch is in the second connection state, the hybrid type vessel propulsion apparatus is in the electric motor drive mode. When the first clutch is in the first connection state and the second clutch is in the second cut-off state, the hybrid type vessel propulsion apparatus is in the engine drive mode. When the first clutch is in the first connection state and the second clutch is in the third connection state, the hybrid type vessel propulsion apparatus is in the engine-drive-plus-electric-motor-generation mode.

According to this structural arrangement, the first clutch is switched between the first cut-off state and the first connection state, and the second clutch is switched between the second cut-off state, the second connection state, and the third connection state. This makes it possible to switch the mode of the hybrid type vessel propulsion apparatus between the electric motor drive mode, the engine drive mode, and the engine-drive-plus-electric-motor-generation mode.

In a preferred embodiment of the present invention, the first transmission path includes a first drive gear that rotates in accordance with rotation of the engine and a first driven gear that is rotationally driven by the first drive gear. The first clutch includes a first dog clutch that is movable along an axial direction of the propeller shaft between a first cut-off position disengaged from the first driven gear and a first connection position engaged with the first driven gear. The first clutch is in the first cut-off state when the first dog clutch is located at the first cut-off position, and the first clutch is in the first connection state when the first dog clutch is located at the first connection position. The second transmission path and the third transmission path share an interlocking gear that rotates in accordance with rotation of the electric motor. The second clutch includes a second dog clutch that is movable along the axial direction between a second cut-off position disengaged from the interlocking gear, a second connection position engaged with the interlocking gear, and a third connection position that is different from the second connection position and that is engaged with the interlocking gear. The second clutch is in the second cut-off state when the second dog clutch is located at the second cut-off position, and the second clutch is in the second connection state when the second dog clutch is located at the second connection position. The second clutch is in the third connection state when the second dog clutch is located at the third connection position. The switch includes a first shift slider, a second shift slider, a connector-disconnector, and a shift actuator. The first shift slider supports the first dog clutch and rotates together with the propeller shaft. The second shift slider supports the second dog clutch and rotates together with the propeller shaft. The connector-disconnector connects the first shift slider and the second shift slider together, or disconnects the first shift slider and the second shift slider from each other. The shift actuator moves the second shift slider in the axial direction.

According to this arrangement, when the first dog clutch of the first clutch moves between the first cut-off position and the first connection position, the first clutch is switched between the first cut-off state and the first connection state. When the second dog clutch of the second clutch moves between the second cut-off position, the second connection position, and the third connection position, the second clutch is switched between the second cut-off state, the second connection state, and the third connection state. The first shift slider supporting the first dog clutch and the second shift slider supporting the second dog clutch move in a state of being mutually connected by the connector-disconnector. This makes it possible to move the first dog clutch between the first cut-off position and the first connection position, and to move the second dog clutch between the second connection position and the second cut-off position. Therefore, it is possible to switch the mode of the hybrid type vessel propulsion apparatus between the electric motor drive mode and the engine drive mode. When the first shift slider and the second shift slider are disconnected from each other by the connector-disconnector in a state in which the first dog clutch is in the first connection position, only the second shift slider moves. This makes it possible to move the second dog clutch between the second cut-off position and the third connection position. Therefore, it is possible to switch the mode of the hybrid type vessel propulsion apparatus between the engine drive mode and the engine-drive-plus-electric-motor-generation mode.

In a preferred embodiment of the present invention, the propeller shaft preferably has a tubular or substantially tubular shape. The first shift slider preferably has a tubular or substantially tubular shape, and extends into the propeller shaft. The second shift slider extends into the first shift slider. The connector-disconnector includes a tapered surface provided on an inner peripheral surface of the propeller shaft, a through-hole provided in a peripheral wall of the first shift slider, a concave portion provided on an outer peripheral surface of the second shift slider, and a connector fitted in the through-hole. The tapered surface relatively moves in the axial direction with respect to the connector. When the through-hole and the concave portion match with each other, the tapered surface that relatively moves with respect to the connector pushes the connector into the concave portion so that the first shift slider and the second shift slider are connected together. The tapered surface that relatively moves with respect to the connector permits the connector to be disconnected from the concave portion so that the first shift slider and the second shift slider are disconnected from each other.

According to this structural arrangement, the connector-disconnector is defined by the tapered surface of the inner peripheral surface of the propeller shaft, the through-hole of the first shift slider in the propeller shaft, the concave portion of the second shift slider in the first shift slider, and the connector fitted in the through-hole. The connector is pushed into the concave portion or is disengaged from the concave portion in accordance with a relative movement of the tapered surface with respect to the connector, thus making it possible to achieve the connection and disconnection between the first shift slider and the second shift slider that are performed by the connector-disconnector.

In a preferred embodiment of the present invention, the hybrid type vessel propulsion apparatus may additionally include a first engagement and a second engagement. The first engagement defines a portion of the second transmission path when engaged with the second dog clutch being in the second connection position, and rotates together with the interlocking gear. The second engagement is different from the first engagement, and defines a portion of the third transmission path when engaged with the second dog clutch being in the third connection position, and rotates together with the interlocking gear. According to this structural arrangement, when the second dog clutch engages with the first engagement at the second connection position, the hybrid type vessel propulsion apparatus is in the electric motor drive mode. When the second dog clutch is located at a position between the second connection position and the third connection position and when the second dog clutch does not engage with each of the first and second engagements, the hybrid type vessel propulsion apparatus is in the engine drive mode. When the second dog clutch engages with the second engagement at the third connection position, the hybrid type vessel propulsion apparatus is in the engine-drive-plus-electric-motor-generation mode. The second dog clutch moves from the second connection position to the third connection position, and, as a result, it is possible to switch the mode of the hybrid type vessel propulsion apparatus in the order of the electric motor drive mode, the engine drive mode, and the engine-drive-plus-electric-motor-generation mode with excellent responsibility.

In a preferred embodiment of the present invention, the hybrid type vessel propulsion apparatus may additionally include an engagement that engages with the second dog clutch being in the second connection position and in the third connection position and that rotates together with the interlocking gear. According to this structural arrangement, there is only one engagement, and therefore the engagement is more easily molded than in a case in which a plurality of engagements are provided.

In a preferred embodiment of the present invention, the electric motor includes a rotor that is rotatable and coaxial with the propeller shaft, and a stator by which the rotor generates a rotational torque. The hybrid type vessel propulsion apparatus additionally includes an actuator that changes a relative position between the rotor and the stator in the axial direction of the propeller shaft in accordance with a shift operation by a vessel operator of the vessel provided with the hybrid type vessel propulsion apparatus.

According to this structural arrangement, a change in magnetic flux density of the electric motor is caused by a change in the relative position between the rotor, which transmits power to and from the propeller shaft, and the stator. Therefore, in accordance with a change in the magnetic flux density, it is possible to generate a high torque in the electric motor when the propeller shaft rotates at a low speed, and it is possible to prevent excessive power generation by significantly reducing or preventing an increase in the induced voltage of the electric motor when the propeller shaft rotates at a high speed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Preferred embodiments of the present invention will be hereinafter described in detail with reference to the accompanying drawings.

Figure 1:
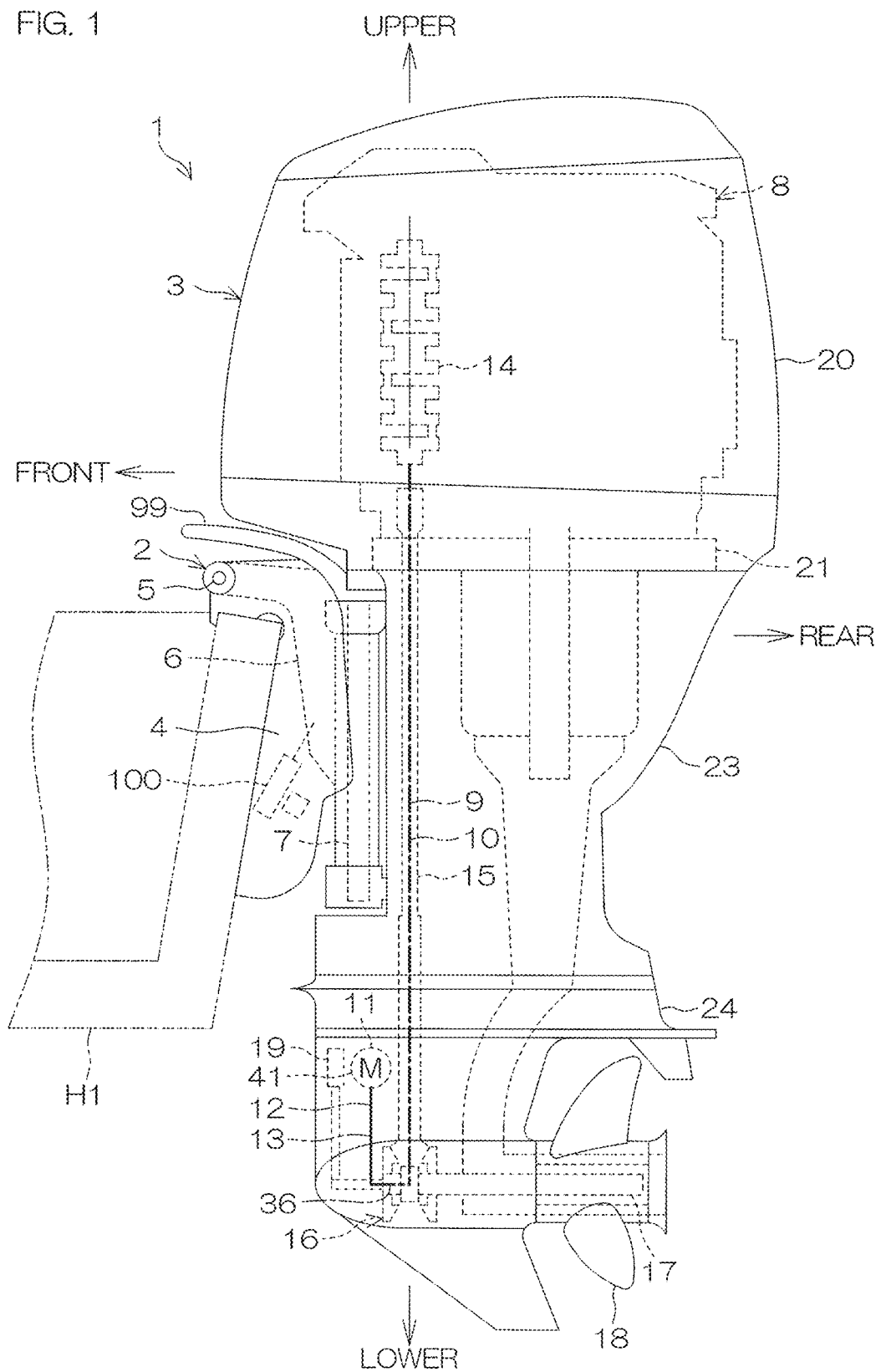
FIG. 1 is a schematic left side view showing a vessel propulsion apparatus according to a first preferred embodiment of the present invention.

FIG. 1 is a schematic left side view showing a vessel propulsion apparatus 1 according to a first preferred embodiment of the present invention. The vessel propulsion apparatus 1 being in a basic posture will be described below. The basic posture is a posture in which a rotational axis of an engine 8 (i.e., a rotational axis of a crankshaft 14) extends in a vertical direction and in which a rotational axis of a propeller shaft 17 perpendicular to the rotational axis of the engine 8 extends in a front-rear direction. A vessel includes a hull H1 that floats on a water surface and the vessel propulsion apparatus 1 that propels the hull H1. The vessel propulsion apparatus 1 includes an outboard motor 3 that generates a thrust and a suspension device 2 by which the outboard motor 3 is attached to a rear portion of the hull H1. The vessel propulsion apparatus 1 additionally includes a steering device 99 that turns the outboard motor 3 rightwardly and leftwardly with respect to the hull H1 and a tilt device 100 that turns the outboard motor 3 upwardly and downwardly with respect to the hull H1.

The suspension device 2 includes a clamp bracket 4 that is attachable to a stern, a swivel bracket 6 that is held by the clamp bracket 4, and a steering shaft 7 that is held by the swivel bracket 6. The swivel bracket 6 is rotatable around a tilting shaft 5 extending in a right-left direction with respect to the clamp bracket 4. The steering shaft 7 extends in an up-down direction, and is rotatable around its axis with respect to the swivel bracket 6.

The outboard motor 3 is disposed behind the hull H1. The outboard motor 3 is connected to an upper end portion and a lower end portion of the steering shaft 7 through an upper mount member and a lower mount member. The outboard motor 3 rotates around the steering shaft 7 together with the steering shaft 7. The outboard motor 3 is rotatable around the steering shaft 7 with respect to the hull H1, and is rotatable around the tilting shaft 5 with respect to the hull H1.

The outboard motor 3 includes a first powertrain including the engine 8 and a second powertrain including an electric motor 11. The engine 8 and the electric motor 11 are each an example of a prime mover that generates power by which a propeller 18 is rotated. Therefore, the vessel propulsion apparatus 1 is a hybrid type vessel propulsion apparatus. The rotational power of the engine 8 is transmitted to the propeller 18 through the propeller shaft 17. Likewise, the rotational power of the electric motor 11 is transmitted to the propeller 18 through the propeller shaft 17. In other words, the propeller shaft 17 is shared between the first and second powertrains.

The first powertrain includes a first transmission member 10 that defines a first transmission path 9 that extends from the engine 8 to the propeller shaft 17 in addition to the engine 8 and the propeller shaft 17. The second powertrain includes a second transmission member 13 that defines a second transmission path 12 that extends from the electric motor 11 to the propeller shaft 17 in addition to the electric motor 11 and the propeller shaft 17.

The first transmission path 9 and the second transmission path 12 are mutually-independent paths disposed in parallel. An upstream end of the first transmission path 9 is connected to the engine 8, and a downstream end of the first transmission path 9 is connected to the propeller shaft 17 inside the outboard motor 3. An upstream end of the second transmission path 12 is connected to the electric motor 11, and a downstream end of the second transmission path 12 is connected to the propeller shaft 17 inside the outboard motor 3. Both the first transmission path 9 and the second transmission path 12 are spaced apart from each other from the engine 8 and the electric motor 11 to the propeller shaft 17.

The first transmission path 9 transmits the power of the engine 8 to the propeller shaft 17. The vessel propulsion apparatus 1 is in an engine drive mode when the propeller shaft 17 is rotated by the power of the engine 8. The second transmission path 12 transmits the power of the electric motor 11 to the propeller shaft 17 without transmitting the power through the first transmission path 9. The vessel propulsion apparatus 1 is in an electric motor drive mode when the propeller shaft 17 is rotated by the power of the electric motor 11.

The vessel propulsion apparatus 1 includes a third transmission path 36 in addition to the first transmission path 9 and the second transmission path 12. The third transmission path 36 includes the first transmission path 9, a portion of the second transmission path 12, and a relay path by which these transmission paths are joined together. The relay path includes, at least, the propeller shaft 17. An upstream region of the third transmission path 36 is the first transmission path 9, and a downstream region of the third transmission path 36 is in a portion of the second transmission path 12. The third transmission path 36 transmits a portion of the power of the engine 8 transmitted from the first transmission path 9 to the propeller shaft 17 to the electric motor 11 in order to generate electric power by the electric motor 11. The vessel propulsion apparatus 1 is in an engine-drive-plus-electric-motor-generation mode both when the propeller shaft 17 is rotated by the power of the engine 8 and when the electric motor 11 generates electricity with a portion of the power of the engine 8.

The outboard motor 3 includes a casing that houses the first and second powertrains. The casing includes a cowl 20 that houses the engine 8, an exhaust guide 21 that is disposed under the engine 8, an upper case 23 that is disposed under the exhaust guide 21, and a lower case 24 that is disposed under the upper case 23. The engine 8 is disposed on the exhaust guide 21. The electric motor 11 is disposed inside the lower case 24.

The first transmission member 10 includes a drive shaft 15 that extends in the up-down direction under the engine 8 and a forward-reverse switching mechanism 16 that is connected to a lower end portion of the drive shaft 15. The drive shaft 15 is disposed in the upper case 23 and the lower case 24. The forward-reverse switching mechanism 16 and the propeller shaft 17 are disposed in the lower case 24. The propeller shaft 17 extends in the front-rear direction in the lower case 24. The propeller 18 is attached to a rear end portion of the propeller shaft 17, and is disposed behind the lower case 24. The propeller 18 rotates in a forward rotation direction or in a reverse rotation direction together with the propeller shaft 17.

The engine 8 rotates the drive shaft 15 in a predetermined rotation direction. The forward-reverse switching mechanism 16 performs switching between a forward state in which the rotation in the forward rotation direction is transmitted from the drive shaft 15 to the propeller shaft 17 and a reverse state in which the rotation in the reverse rotation direction is transmitted from the drive shaft 15 to the propeller shaft 17. The forward-reverse switching mechanism 16 also shifts to a neutral state in which the transmission of the rotation from the drive shaft 15 to the propeller shaft 17 is cut off. A shift device 19 of the outboard motor 3 shifts the state of the forward-reverse switching mechanism 16 to the other state, and thus shifts the direction of the rotation transmitted from the engine 8 to the propeller 18 to the other direction.

Figure 2:
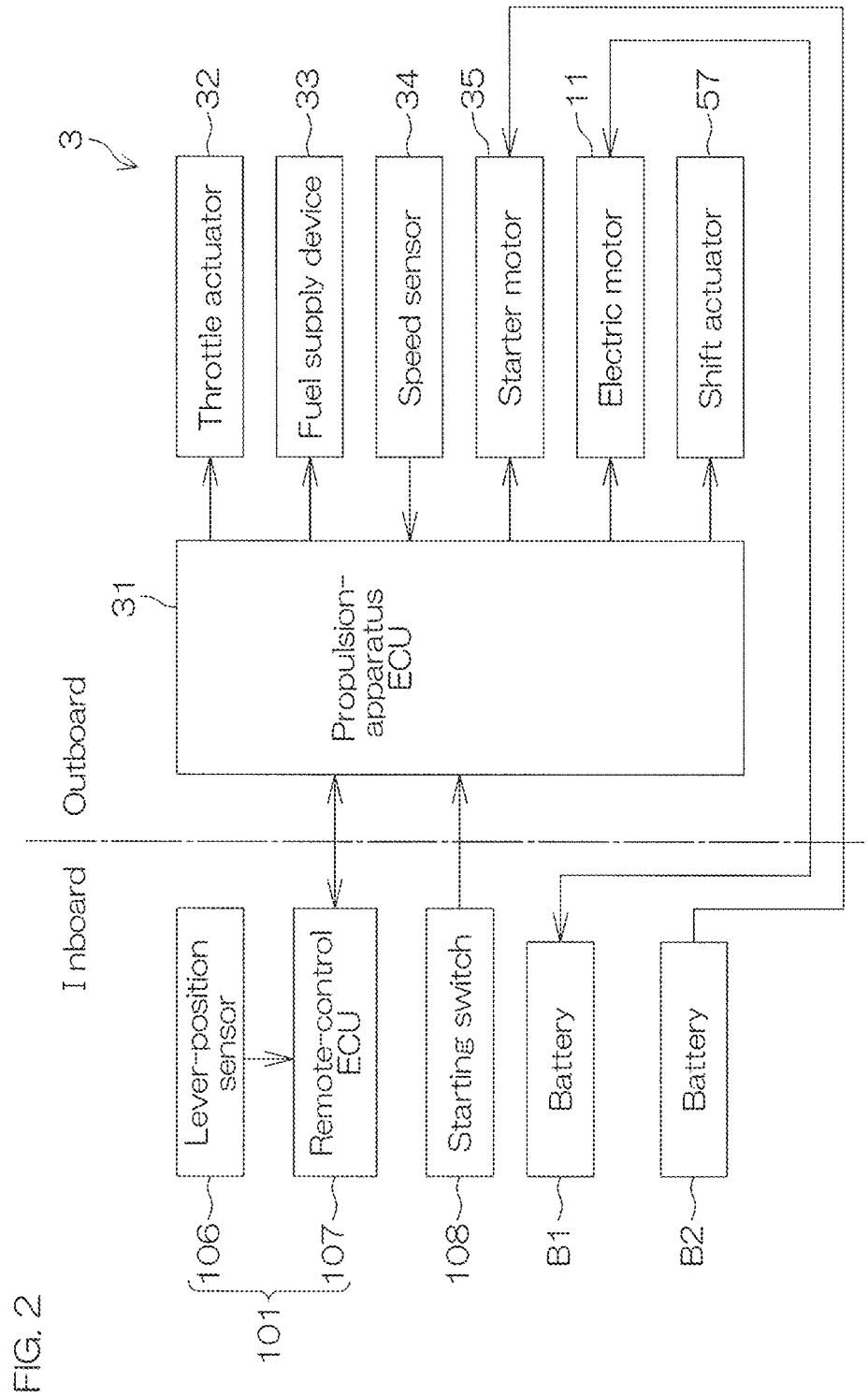
FIG. 2 is a block diagram showing an electrical configuration of the vessel propulsion apparatus.

FIG. 2 is a block diagram showing an electrical configuration of the vessel propulsion apparatus 1. The outboard motor 3 includes a propulsion-apparatus ECU 31, a throttle actuator 32 that changes the opening degree of a throttle valve that changes the flow rate of air supplied to a combustion chamber, and a fuel supply device 33 that changes the flow rate of fuel supplied to the combustion chamber. The propulsion-apparatus ECU (Electronic Control Unit) 31 is an example of a controller that controls the vessel propulsion apparatus 1. The propulsion-apparatus ECU 31 changes the output of the engine 8 by controlling the throttle actuator 32 and the fuel supply device 33. The rotation speed of the engine 8 (i.e., the rotation speed of the crankshaft 14) is detected by a speed sensor 34. The rotation speed of the electric motor 11 is detected by another speed sensor (not shown), and is input into the propulsion-apparatus ECU 31. The propulsion-apparatus ECU 31 allows a starter motor 35 located in the cowl 20 to start the engine 8.

The vessel propulsion apparatus 1 includes a remote control unit 101 that is operated by a user when switching between the forward traveling and the reverse traveling of the vessel and when adjusting the output of the vessel propulsion apparatus 1, and includes a starting switch 108 that is operated by the user when the vessel propulsion apparatus 1 is started. The remote control unit 101 and the starting switch 108 are disposed on the hull H1. The operation of the remote control unit 101 and the operation of the starting switch 108 performed by the user are electrically transmitted to the propulsion-apparatus ECU 31 in a wireless or wired manner.

The electric motor 11 is connected to a battery B1 disposed in the hull H1. The battery B1 is an example of a power source that supplies operational power to the electric motor 11. The starter motor 35 is connected to a battery B2 disposed in the hull H1.

As an existing electric distribution system, the vessel propulsion apparatus 1 is provided with an electric generator, such as an alternator, that is disposed in the engine 8, wiring by which the electric generator and the battery B2 are connected together, and a REC/REG that is disposed between both ends of the wiring and that converts alternating current of the electric generator into direct current or rectifies the direction of the electric current. The electric generator generates electricity in accordance with rotation of the engine 8, and charges the battery B2. In the vessel propulsion apparatus 1, the operational voltage of each electrical component (auxiliary) other than the electric motor 11 is 12 V as an example. On the other hand, the operational voltage of the electric motor 11 is a high voltage of, for example, 48 V. The REC/REG includes a rectifier that converts alternating current into direct current and a regulator that controls the voltage to be smaller than a predetermined voltage. The electric motor 11 and the starter motor 35 may be connected to the same battery.

Figure 3:
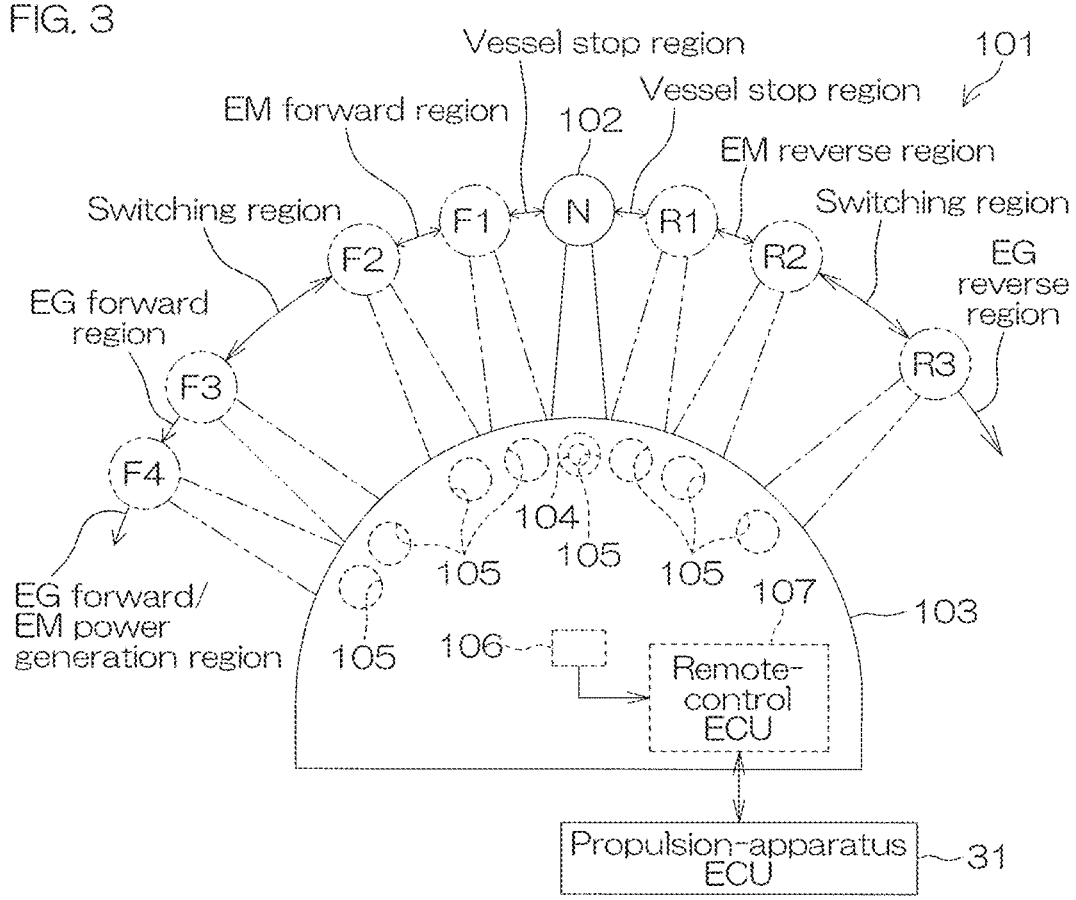
FIG. 3 is a schematic view of a remote control unit.

FIG. 3 is a schematic view of the remote control unit 101. The remote control unit 101 includes an operation lever 102 that is operated by the user and a remote control box 103 that supports a base portion of the operation lever 102 so that the operation lever 102 is able to tilt in the front-rear direction. The operation lever 102 is a throttle operation member that is operated when the output of the vessel propulsion apparatus 1 is adjusted, and is a shift operation member that is operated when switching between the forward traveling and the reverse traveling of the vessel. The remote control unit 101 may include both a throttle operation member and a shift operation member that are independent of each other instead of the operation lever 102.

The operation lever 102 is tiltable in the front-rear direction from the neutral position N. The neutral position N is an origin position at which the vessel propulsion apparatus 1 does not generate a thrust. A region that extends forwardly from the neutral position N is a forward region in which the vessel propulsion apparatus 1 propels the vessel forwardly. A region that extends rearwardly from the neutral position N is a reverse region in which the vessel propulsion apparatus 1 propels the vessel rearwardly.

The user is able to move the operation lever 102 to a first forward position F1, a second forward position F2, a third forward position F3, and a fourth forward position F4 in this order by tilting the operation lever 102 forwardly from the neutral position N. The user is able to move the operation lever 102 more forwardly by tilting the operation lever 102 forwardly from the fourth forward position beyond the fourth forward position F4. A region ranging from the neutral position N to the first forward position F1 is a vessel stop region in which both the engine 8 and the electric motor 11 are stopped. A region ranging from the first forward position F1 to the second forward position F2 is an EM (Electric Motor) forward region in which the propeller 18 is rotated at a low speed in the forward rotation direction only by the electric motor 11. A region ranging from the second forward position F2 to the third forward position F3 is a switching region in which the prime mover is switched between the engine 8 and the electric motor 11. A region ranging from the third forward position F3 to the fourth forward position F4 is an EG (Engine) forward region in which the propeller 18 is rotated at a high speed in the forward rotation direction only by the engine 8. A region extending forwardly beyond the fourth forward position F4 is an EG-forward EM-generation region in which the propeller 18 is rotated in the forward rotation direction only by the engine 8 while the electric motor 11 generates electricity.

Likewise, the user is able to move the operation lever 102 to a first reverse position R1, a second reverse position R2, and a third reverse position R3 in this order by tilting the operation lever 102 rearwardly from the neutral position N, and move the operation lever 102 more rearwardly beyond the third reverse position R3. A region ranging from the neutral position N to the first reverse position R1 is a vessel stop region in which both the engine 8 and the electric motor 11 are stopped. A region ranging from the first reverse position R1 to the second reverse position R2 is an EM reverse region in which the propeller 18 is rotated at a low speed in the reverse rotation direction only by the electric motor 11. A region ranging from the second reverse position R2 to the third reverse position R3 is a switching region in which the prime mover is switched between the engine 8 and the electric motor 11. A region extending rearwardly beyond the third reverse position R3 is an EG reverse region in which the propeller 18 is rotated at a high speed in the reverse rotation direction only by the engine 8.

When the operation lever 102 is in the EM forward region or in the EM reverse region, the vessel propulsion apparatus 1 is in the electric motor drive mode, and the vessel travels at a low speed. When the operation lever 102 is in the EG forward region or in the EG reverse region, the vessel propulsion apparatus 1 is in the engine drive mode, and the vessel travels at a high speed. When the operation lever 102 is in the EG-forward EM-generation region, the vessel propulsion apparatus 1 is in the engine-drive-plus-electric-motor-generation mode, and the vessel travels at a cruising speed, and the electric motor 11 generates electricity.

When the user places the operation lever 102 at the neutral position N, a projection 104 disposed at the operation lever 102 is fitted into a hollow 105 in the remote control box 103, and the operational resistance of the operation lever 102 is increased. When the user tilts the operation lever 102 forwardly or rearwardly from the neutral position N, the projection 104 comes off from the hollow 105. Thus, whether or not the operation lever 102 is in the neutral position N is sensuously transmitted to the user. This hollow 105 is also provided at a position corresponding to each of the first forward position F1, the second forward position F2, the third forward position F3, the fourth forward position F4, the first reverse position R1, the second reverse position R2, and the third reverse position R3.

The remote control unit 101 includes a lever-position sensor 106 that detects the position of the operation lever 102. The remote control unit 101 additionally includes a remote-control ECU 107 that outputs a shift change signal that shifts the outboard motor 3 and an output change signal that changes the output of the vessel propulsion apparatus 1 to the propulsion-apparatus ECU 31 in accordance with a detection value of the lever-position sensor 106. The propulsion-apparatus ECU 31 performs switching between the forward traveling and the reverse traveling of the vessel in accordance with the position of the operation lever 102. Additionally, the propulsion-apparatus ECU 31 increases the output of the engine 8 in proportion to an increase in displacement of the operation lever 102 from the neutral position N in each of the EG forward region, the EG-forward EM-generation region, and the EG reverse region. The propulsion-apparatus ECU 31 may increase or fix the output of the electric motor 11 in proportion to an increase in displacement of the operation lever 102 from the neutral position N in each of the EM forward region and the EM reverse region.

Figure 4:
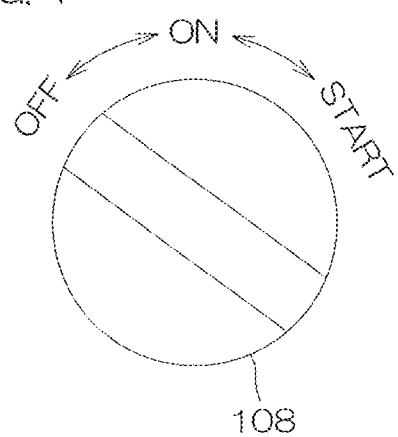
FIG. 4 is a schematic view of a starting switch.

FIG. 4 is a schematic view of the starting switch 108. The starting switch 108 is able to be moved to an operational position, i.e., able to take any one of an OFF position, an ON position, and a START position by an operation performed by the user. FIG. 4 shows an example in which the starting switch 108 is a rotary switch. Without being limited to the rotary switch, the starting switch 108 may be a push type switch or a pull type switch, or may be a switch other than these switches. The ON position is a position between the OFF position and the START position. When the user releases the starting switch 108 after the starting switch 108 is moved to the START position, the starting switch 108 automatically returns to the ON position.

The OFF position is a position at which a first electric circuit that connects the battery B1 and the electric motor 11 together and a second electric circuit that connects the battery B2 and an auxiliary, such as the starter motor 35, in the vessel propulsion apparatus 1 together are cut off. The ON position is a position at which the cut-off of the first and second electric circuits is released, and the battery B1 and the electric motor 11 are connected together through the first electric circuit, and the battery B2 and the auxiliary are connected together through the second electric circuit. The START position is a position at which the starter motor 35 is operated or at which the propulsion-apparatus ECU 31 is allowed to store the information that the operation of the starter motor 35 has been permitted.

When the operation lever 102 is in the neutral position N, the user moves the starting switch 108 from the OFF position to the START position through the ON position, and, as a result, the first electric circuit and the second electric circuit are closed. Furthermore, a start permission command by which the start of the engine 8 is permitted is input into the propulsion-apparatus ECU 31, and the information that the start of the engine 8 has been permitted is stored in the propulsion-apparatus ECU 31. This information stored in the propulsion-apparatus ECU 31 is maintained until the starting switch 108 is moved to the OFF position. The propulsion-apparatus ECU 31 allows the starter motor 35 to start the engine 8 in accordance with the position of the operation lever 102 as described below.

Figure 5:
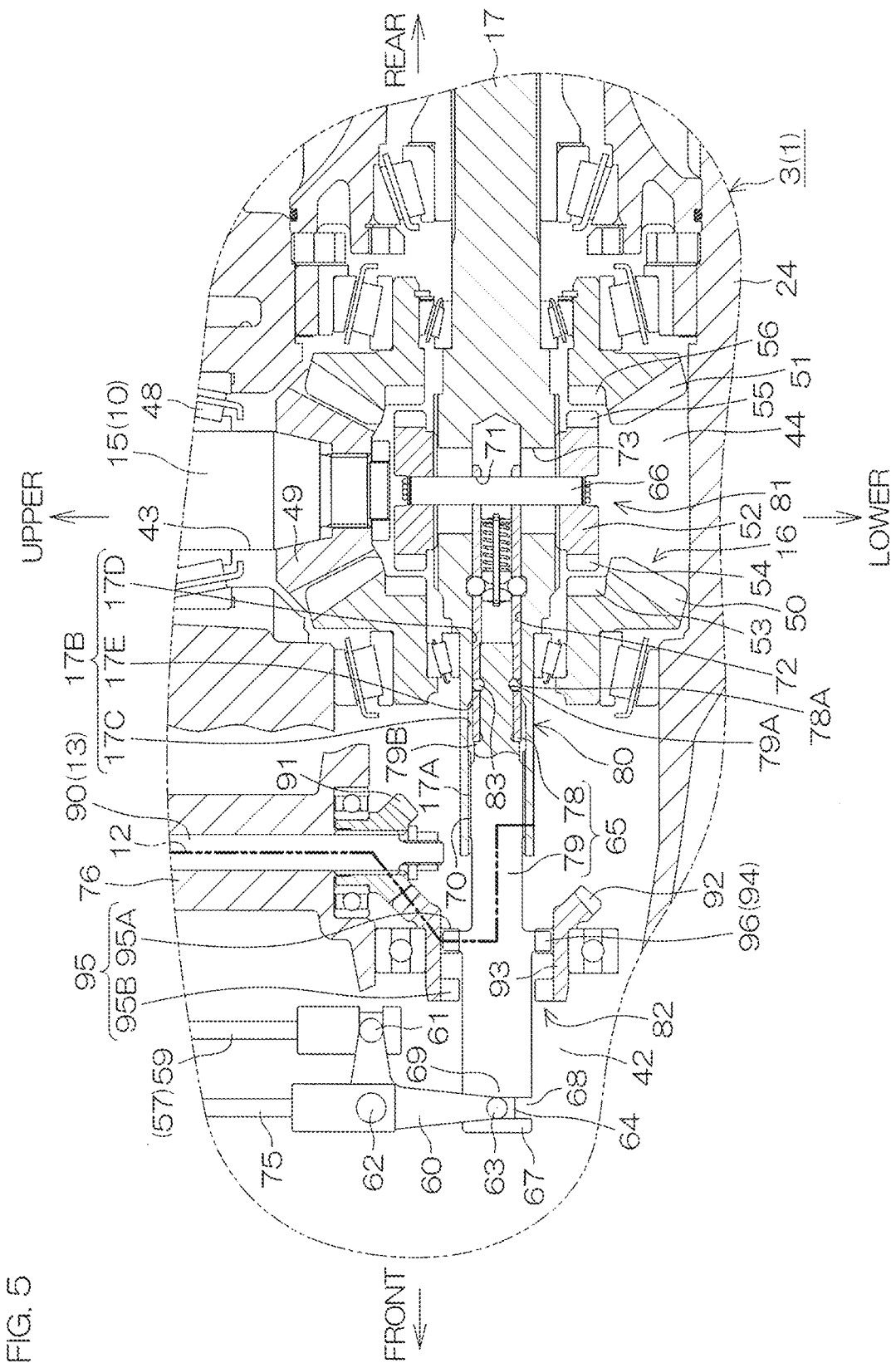
FIG. 5 is a cross-sectional view showing a portion of a vertical cross section of a lower unit of an outboard motor.

FIG. 5, FIG. 6, FIG. 7, and FIG. 8 are cross-sectional views, each showing a portion of a vertical cross section of a lower unit of the outboard motor 3, and depict mutually-different states. As shown in FIG. 5, the lower case 24 defines a first housing chamber in which the first powertrain is housed and a second housing chamber in which the second powertrain is housed. The first housing chamber includes a shaft insertion hole 43 in which the drive shaft 15 is inserted and a gear chamber 44 in which the forward-reverse switching mechanism 16 is disposed. The second housing chamber includes a motor chamber (see FIG. 1) in which the electric motor 11 is disposed and a shift chamber 42 in which a front end portion of a shift slider 65 described below is disposed.

The shaft insertion hole 43 extends upwardly from the gear chamber 44, and the motor chamber 41 extends upwardly from the shift chamber 42. The shaft insertion hole 43 and the motor chamber 41 are spaced apart from each other in the front-rear direction, and the gear chamber 44 and the shift chamber 42 are connected together. The shift chamber 42 is separated from the motor chamber 41 by a spacer (not shown). Lubricating oil is stored in the shaft insertion hole 43, in the gear chamber 44, and in the shift chamber 42.

The forward-reverse switching mechanism 16 includes a pinion 49 that rotates together with the drive shaft 15, a front gear 50 that is rotationally driven by the pinion 49, and a rear gear 51 that is rotationally driven by the pinion 49 in a direction opposite to the front gear 50. The forward-reverse switching mechanism 16 additionally includes a first dog clutch 52 that is movable between a first connection position to engage with one of the front and rear gears 50 and 51 and a first cut-off position to disengage from both the front gear 50 and the rear gear 51. The pinion 49 is an example of a first drive gear, and the front gear 50 and the rear gear 51 are each an example of a first driven gear.

The pinion 49, the front gear 50, and the rear gear 51 are respectively bevel gears. The pinion 49 is coaxial with the drive shaft 15, and is fixed to a lower end of the drive shaft 15. The front gear 50 and the rear gear 51 are coaxial with the propeller shaft 17. The front gear 50 and the rear gear 51 surround the propeller shaft 17, and are rotatably supported by the lower case 24. The front gear 50 and the rear gear 51 face each other in the front-rear direction with an interval between the front gear 50 and the rear gear 51.

The first dog clutch 52 is disposed between the front gear 50 and the rear gear 51. The first dog clutch 52 is positioned below the pinion 49. The first dog clutch 52 has a cylindrical shape that surrounds the propeller shaft 17. The first dog clutch 52 is joined with the propeller shaft 17 by a spline that extends in the front-rear direction. The first dog clutch 52 is movable along the front-rear direction with respect to the propeller shaft 17, and is rotatable together with the propeller shaft 17.

The first dog clutch 52 includes a plurality of front convex portions 54 that respectively engage with a plurality of front concave portions 53 of the front gear 50 and a plurality of rear convex portions 55 that respectively with engage a plurality of rear concave portions 56 of the rear gear 51. The plurality of front convex portions 54 are disposed at equal intervals in a circumferential direction of the first dog clutch 52, and extend in the front-rear direction that corresponds to an axial direction of the propeller shaft 17 and to that of the first dog clutch 52. The same applies to the plurality of the rear convex portions 55 as the plurality of front convex portions 54. The first dog clutch 52, the front concave portion 53, and the rear concave portion 56 are provided in a first clutch 81.

Figure 7:
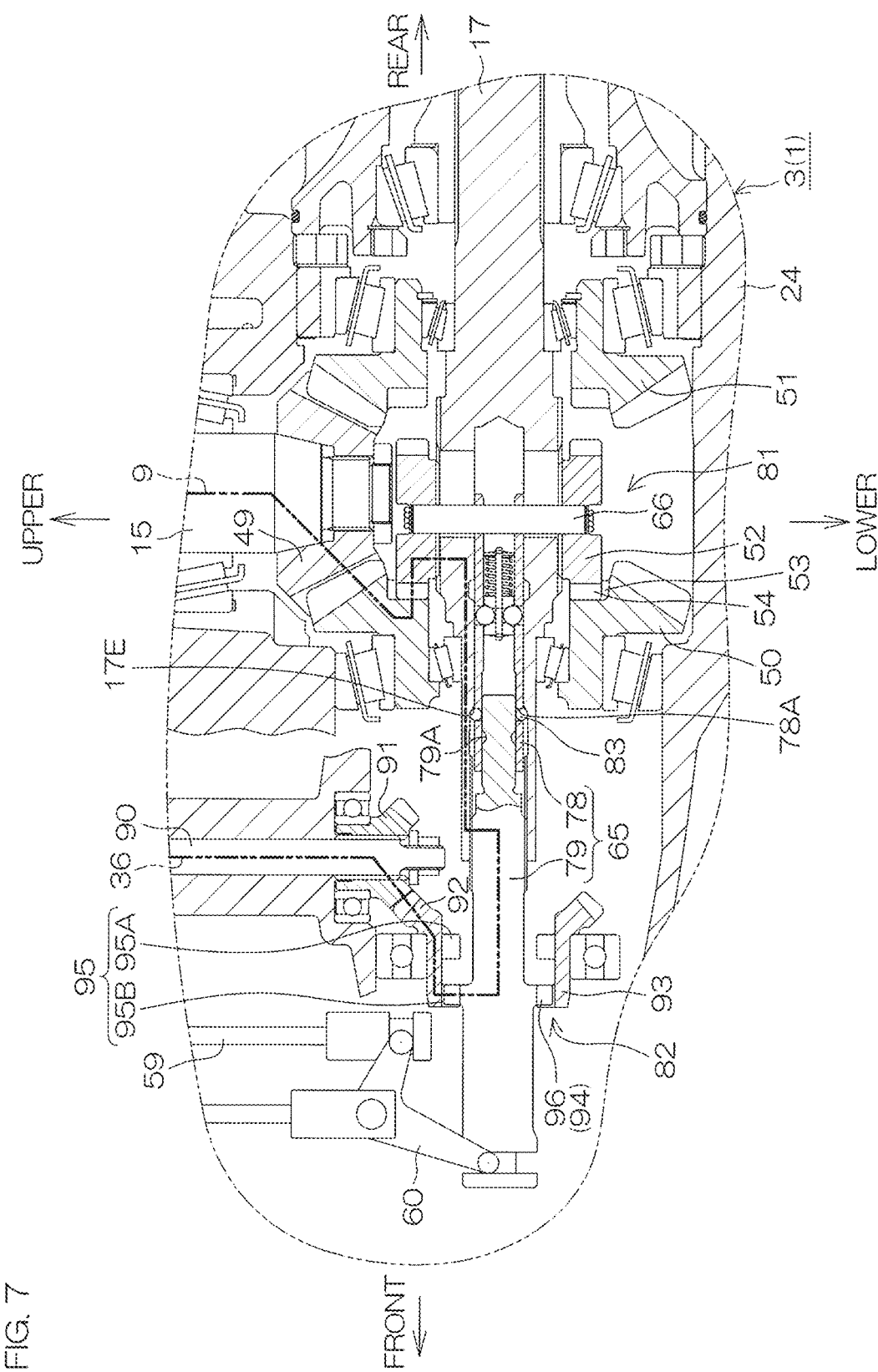
FIG. 7 is a cross-sectional view showing a portion of a vertical cross section of the lower unit of the outboard motor.
Figure 8:
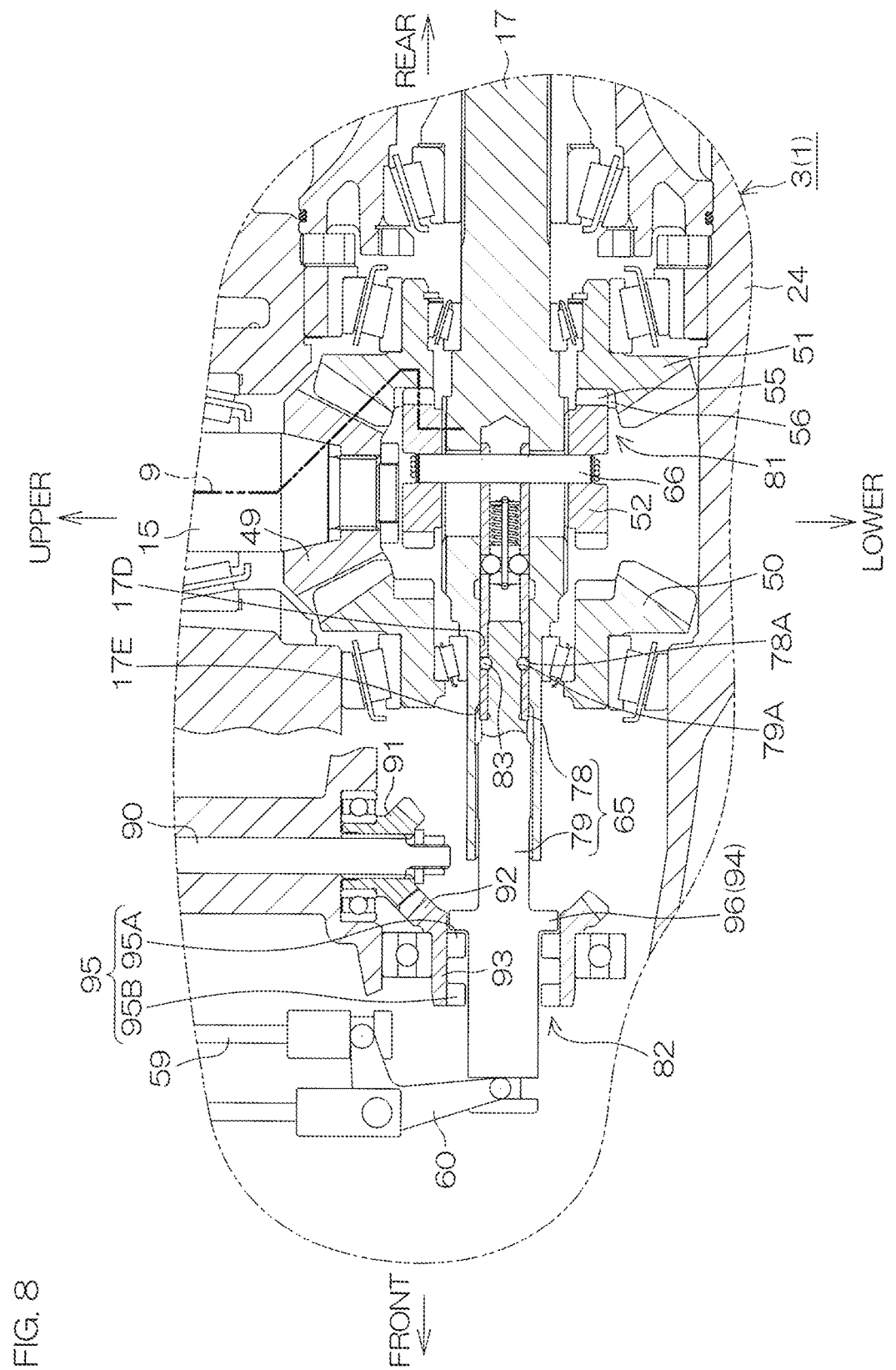
FIG. 8 is a cross-sectional view showing a portion of a vertical cross section of the lower unit of the outboard motor.

The first dog clutch 52 is located at any one of a forward position (shown in FIG. 6 and FIG. 7), a neutral position (shown in FIG. 5), and a reverse position (shown in FIG. 8). The forward position is a position at which the front convex portion 54 of the first dog clutch 52 engages with the front concave portion 53 of the front gear 50 and at which the first dog clutch 52 rotates together with the front gear 50. The reverse position is a position at which the rear convex portion 55 of the first dog clutch 52 engages with the rear concave portion 56 of the rear gear 51 and at which the first dog clutch 52 rotates together with the rear gear 51. The neutral position is a position at which the first dog clutch 52 is disengaged from the front gear 50 and from the rear gear 51 so that the transmission of the rotation from the drive shaft 15 to the propeller shaft 17 is cut off. The neutral position is a first cut-off position at which the power transmission of the first transmission path 9 is cut off, and the forward position and the reverse position are each a first connection position at which the power transmission of the first transmission path 9 is permitted. When the first dog clutch 52 is located at the neutral position, the first clutch 81 is in a first cut-off state. When the first dog clutch 52 is located at the first connection position, the first clutch 81 is in a first connection state.

As shown in FIG. 5, the shift device 19 includes a shift actuator 57 that generates power by which the state of the forward-reverse switching mechanism 16 is switched and the shift slider 65 that moves in the front-rear direction. The shift device 19 includes a link arm 60 that has the shape of the letter L in a lateral view and a connection pin 66 that connects the first dog clutch 52 and the shift slider 65 together. The shift device 19 is an example of a switch.

At least one portion of the shift actuator 57 is disposed in the lower case 24. The shift actuator 57 includes a shift rod 59 that is movable in an axial direction, a shift motor that generates power by which the shift rod 59 is moved in its axial direction, and a ball screw and a ball nut both of which convert the rotation of the shift motor into a rectilinear motion of the shift rod 59. The shift actuator 57 includes a shift housing in which the shift motor, the ball screw, and the ball nut are housed.

The shift housing is fixed to the lower case 24 through the aforementioned spacer. The shift rod 59 protrudes downwardly from a shift housing 58. The shift rod 59 extending in the up-down direction is parallel or substantially parallel to the drive shaft 15. When the shift motor rotates its output shaft, the ball nut and the ball screw relatively rotate, and the shift rod 59 moves in the axial direction of the shift rod 59 with respect to the shift housing. Thus, the amount of protrusion of the shift rod 59 from the shift housing changes.

The shift slider 65 includes a first shift slider 78 and a second shift slider 79. The first shift slider 78 and the second shift slider 79 extend in the front-rear direction in the lower case 24. The first shift slider 78 and the second shift slider 79 are coaxial with the propeller shaft 17. The first shift slider 78 is disposed at a more rearward position than the second shift slider 79. Most portions of the second shift slider 79 are positioned in front of the propeller shaft 17. The first shift slider 78 preferably has a tubular or substantially tubular shape. The first shift slider 78 is inserted in a center hole 72 that extends rearwardly from a front end portion in the propeller shaft 17 that preferably has a tubular or substantially tubular shape. Substantially a rear half of the second shift slider 79 is inserted in the center hole 72. A rear end portion of the second shift slider 79 is inserted in the first shift slider 78 in the center hole 72. A region adjacent to a rear end portion from the front in the second shift slider 79 includes a spline portion 70 provided with a plurality of teeth extending in the front-rear direction at its outer periphery. The spline portion 70 is spline-coupled to a spline portion 17A of the propeller shaft 17 in the center hole 72. The second shift slider 79 is movable in the front-rear direction with respect to the propeller shaft 17, and is rotatable together with the propeller shaft 17.

The connection pin 66 is inserted in a through-hole 73 that passes through the propeller shaft 17 in a radial direction of the propeller shaft 17. A rear end of the center hole 72 of the propeller shaft 17 is connected to the through-hole 73. A rear end portion of the first shift slider 78 is disposed in the through-hole 73. The connection pin 66 is inserted in an insertion hole 71 of the rear end portion of the first shift slider 78 in the through-hole 73. Both end portions of the connection pin 66 are connected to the first dog clutch 52 surrounding the through-hole 73. The connection pin 66 is movable in the front-rear direction in the through-hole 73. The connection pin 66 is movable in the front-rear direction with respect to the propeller shaft 17 together with the first dog clutch 52 and the first shift slider 78, and is rotatable together with the first dog clutch 52, the first shift slider 78, and the propeller shaft 17.

The shift device 19 additionally includes a connector-disconnector 80 by which the first shift slider 78 and the second shift slider 79 are connected together or are disconnected from each other. The connector-disconnector 80 includes an inner peripheral surface 17B of the propeller shaft 17 in the center hole 72 and a through-hole 78A in a peripheral wall of the front end portion of the first shift slider 78. The connector-disconnector 80 includes a concave portion 79A on an outer peripheral surface of the rear end portion of the second shift slider 79 and a connector 83.

The inner peripheral surface 17B of the propeller shaft 17 includes a front circumferential surface 17C that is adjacent to the spline portion 17A from the rear, a rear circumferential surface 17D that is disposed at a more rearward position than the front circumferential surface 17C and that is smaller in diameter than the front circumferential surface 17C, and a tapered surface 17E that becomes smaller in diameter as it extends toward a front end of the rear circumferential surface 17D from a rear end of the front circumferential surface 17C. The front circumferential surface 17C and the rear circumferential surface 17D are flat in the front-rear direction. The through-hole 78A may include, for example, a plurality of through-holes 78A, and these through-holes 78A are disposed in a circumferential direction of the first shift slider 78. An example of the concave portion 79A is a groove that extends in a circumferential direction of the second shift slider 79. An annular stepped portion 79B is provided between the spline portion 70 and the concave portion 79A in the outer peripheral surface of the second shift slider 79.

The connector 83 is a ball. Each of the connectors 83 that correspond in number to the through-holes 78A is fitted in each of the through-holes 78A. Each connector 83 is incapable of coming off from the through-hole 78A. The operation of the connector-disconnector 80 will be described below.

The link arm 60 includes a first end portion connected to the shift rod 59 through a first pin 61, a second end portion connected to a pusher 64 through a second pin 63, and an intermediate portion connected to a holder 75 through an intermediate pin 62. The first pin 61, the second pin 63, and the intermediate pin 62 extend in the right-left direction. The holder 75 extends downwardly from the aforementioned spacer, and is fixed to the lower case 24 through the spacer. The link arm 60 is rotatable around a center line of the intermediate pin 62 with respect to the holder 75.

When the shift rod 59 moves in the up-down direction, the first end portion of the link arm 60 is pressed upwardly or downwardly, and turns in the up-down direction around the center line of the intermediate pin 62. Accordingly, the second end portion of the link arm 60 turns in the front-rear direction around the center line of the intermediate pin 62. Thus, the pusher 64 is pressed forwardly or rearwardly.

The pusher 64 is inserted in an annular groove 68 surrounding the second shift slider 79 around a center line of the second shift slider 79. A front end portion of the second shift slider 79 includes an annular front facing portion 67 and an annular rear facing portion 69 that define a side surface of the annular groove 68. The front facing portion 67 is disposed in front of the pusher 64, and the rear facing portion 69 is disposed behind the pusher 64. The front facing portion 67 and the rear facing portion 69 face the pusher 64 even when the second shift slider 79 has any rotation angle. When the pusher 64 moves forwardly, the front facing portion 67 is pressed forwardly, and the second shift slider 79 moves forwardly. On the contrary, when the pusher 64 moves rearwardly, the rear facing portion 69 is pressed rearwardly, and the second shift slider 79 moves rearwardly.

Next, the second powertrain that includes the electric motor 11 will be described.

The electric motor 11 is disposed in front of the drive shaft 15. The drive shaft 15 is rotatably supported by the lower case 24 through, for example, a bearing 48 positioned above the pinion 49. The electric motor 11 is, for example, a stepping motor, and is fixed to the lower case 24. The electric motor 11 includes an output shaft that extends parallel or substantially parallel to the drive shaft 15 and that protrudes downwardly.

The second transmission member 13 includes a deceleration mechanism that decelerates and transmits the rotation of the electric motor 11 (the rotation of the aforementioned output shaft) and an intermediate shaft 90 that transmits the rotation decelerated and transmitted by the deceleration mechanism to the propeller shaft 17. The second transmission member 13 additionally includes a second drive gear 91 that rotates together with the intermediate shaft 90 and a second driven gear 92 that is rotationally driven by the second drive gear 91. The second driven gear 92 is an example of an interlocking gear that rotates in accordance with the rotation of the electric motor 11. The second transmission member 13 additionally includes an intermediate ring 93 that rotates together with the second driven gear 92 and a second shift slider 79 that is surrounded by the second driven gear 92 and the intermediate ring 93. The second shift slider 79 is shared between the second transmission member 13 and the shift device 19.

The deceleration mechanism includes, for example, a planetary gear mechanism, and is connected to the output shaft of the electric motor 11 and the intermediate shaft 90. When the electric motor 11 rotates the output shaft, the rotation of the electric motor 11 is decelerated by the deceleration mechanism, and is transmitted to the intermediate shaft 90.

The intermediate shaft 90 is coaxial with the electric motor 11. The intermediate shaft 90 may be eccentric with respect to the electric motor 11. The intermediate shaft 90 extends downwardly from the deceleration mechanism. The intermediate shaft 90 is parallel or substantially parallel to the drive shaft 15. The intermediate shaft 90 is disposed in a cylindrical shaft housing 76 fixed to the lower case 24. The intermediate shaft 90 is connected to the second drive gear 91. The second drive gear 91 is fixed to a lower end of the intermediate shaft 90. The intermediate shaft 90 and the second drive gear 91 are rotatable with respect to the shaft housing 76.

Both the second drive gear 91 and the second driven gear 92 are bevel gears. The second drive gear 91 is positioned above the second shift slider 79. The second driven gear 92 is positioned in front of the propeller shaft 17. The second driven gear 92 is coaxial with the second shift slider 79, and surrounds the second shift slider 79 with an interval in the radial direction of the second shift slider 79. The second driven gear 92 is spaced apart from the second shift slider 79. The second driven gear 92 is disposed at a more forward position than the spline portion 70 of the second shift slider 79 and at a more forward position than a rotational axis of the second drive gear 91. The second driven gear 92 may be disposed at a more rearward position than the rotational axis of the second drive gear 91.

The intermediate ring 93 is coaxial with the second shift slider 79, and surrounds the second shift slider 79. The intermediate ring 93 and the second driven gear 92 are preferably a single integral member. The intermediate ring 93 may be a member that is fixed to the second driven gear 92 and that differs from the second driven gear 92. In any case, the intermediate ring 93 may be regarded as a portion of the second driven gear 92. The intermediate ring 93 extends forwardly from the second driven gear 92. The intermediate ring 93 is rotatably supported by the lower case 24 through the bearing and the shaft housing 76.

An engagement 95 is disposed on an inner peripheral surface of the intermediate ring 93. The engagement 95 includes a first engagement 95A positioned at a rear end of the inner peripheral surface of the intermediate ring 93 and a second engagement 95B that is disposed independently of the first engagement 95A and that is separated forwardly from the first engagement 95A. The first engagement 95A and the second engagement 95B are concave portions each of which is located between a plurality of convex portions disposed in the circumferential direction in the inner peripheral surface of the intermediate ring 93. The first engagement 95A and the second engagement 95B rotate together with the intermediate ring 93 and the second driven gear 92.

The deceleration mechanism, the intermediate shaft 90, the second drive gear 91, the second driven gear 92, the intermediate ring 93, and the second shift slider 79 are shared between the second transmission path 12 and the third transmission path 36.

The second transmission member 13 includes a second clutch 82. The second clutch 82 includes a second dog clutch 94 that is movable in the front-rear direction with respect to a second connection position to engage with a first engagement 95A of the intermediate ring 93, a third connection position to engage with a second engagement 95B of the intermediate ring 93, and a second cut-off position to be disengaged from the first engagement 95A and from the second engagement 95B.

FIG. 5 shows an example in which the second dog clutch 94 and the second shift slider 79 are a single integral member. The second dog clutch 94 may be a member that is fixed to the second shift slider 79 and that differs from the second shift slider 79. The second shift slider 79 is rotatable together with the propeller shaft 17, and therefore the second dog clutch 94 supported by the second shift slider 79 is also rotatable together with the propeller shaft 17.

The second dog clutch 94 includes a plurality of convex portions 96 that selectively engage with the first engagement 95A and the second engagement 95B of the intermediate ring 93. The plurality of convex portions 96 are disposed at equal intervals in the circumferential direction of the second dog clutch 94. The plurality of convex portions 96 protrude outwardly from the second shift slider 79 in the radial direction of the second dog clutch 94. The convex portion 96 and the intermediate ring 93 are positioned between the annular groove 68 and the spline portion 70 in the front-rear direction.

The second dog clutch 94 is disposed at any one of the second connection position (shown in FIG. 5), a front cut-off position (shown in FIG. 6), the third connection position (shown in FIG. 7), and a rear cut-off position (shown in FIG. 8). The front cut-off position and the rear cut-off position are each the aforementioned second cut-off position. The second connection position and the third connection position differ from each other.

When the second dog clutch 94 moves to the second connection position, each of the convex portions 96 of the second dog clutch 94 is fitted into the first engagement 95A of the intermediate ring 93. Thus, the second dog clutch 94 and the first engagement 95A are incorporated in the second transmission path 12, and, as a result, the second transmission path 12 is opened, and the second clutch 82 is in a second connection state (see FIG. 5). In the second connection state, the rotation of the electric motor 11 is transmitted to the propeller shaft 17 through the second transmission path 12 without generating slippage. In other words, the second clutch 82 being in the second connection state permits the power transmission of the second transmission path 12. In this state, the second dog clutch 94 does not engage with the second engagement 95B of the intermediate ring 93, and the power transmission of the third transmission path 36 is cut off.

Figure 6:
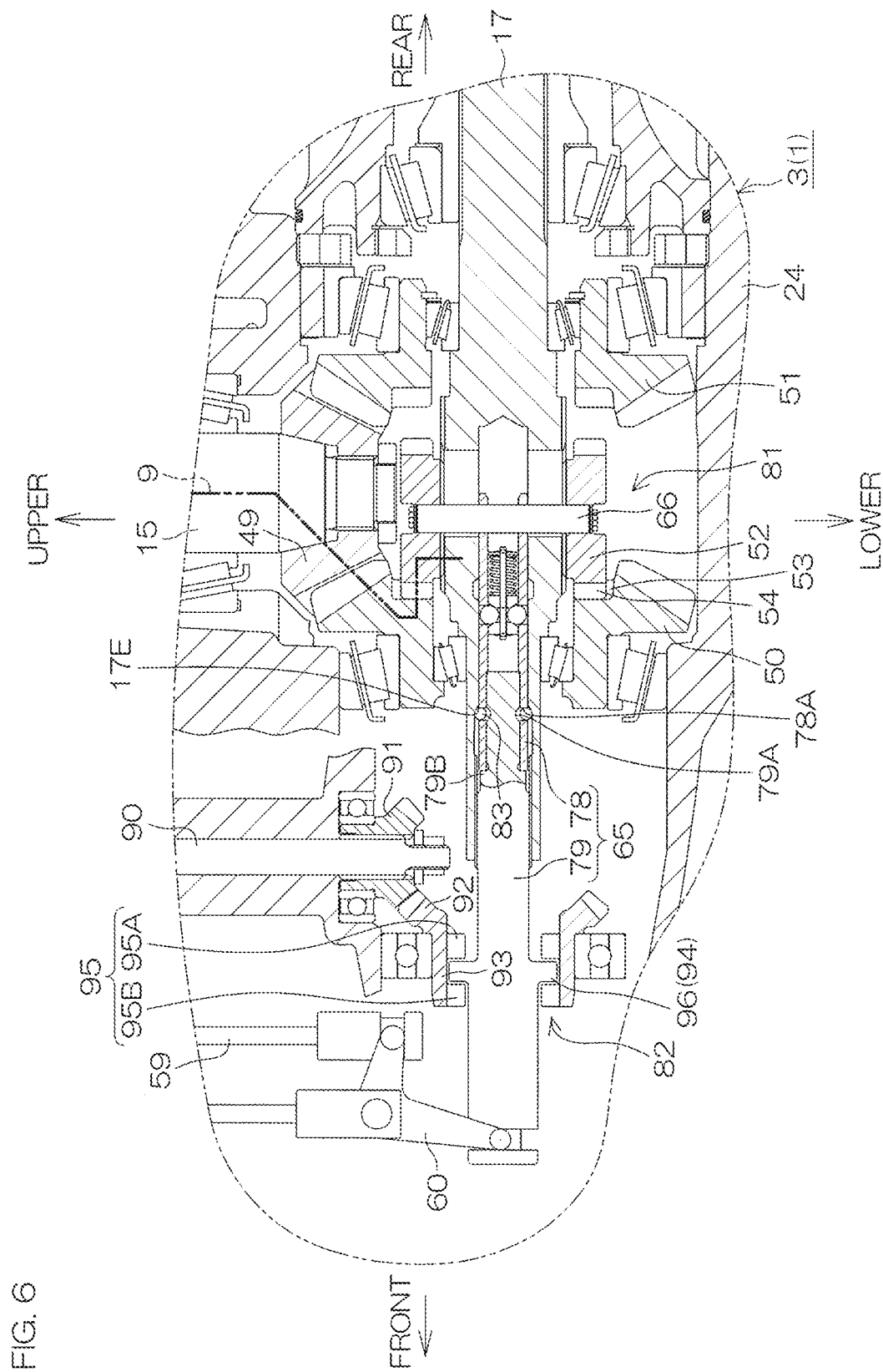
FIG. 6 is a cross-sectional view showing a portion of a vertical cross section of the lower unit of the outboard motor.

When the second dog clutch 94 moves from the second connection position to the front cut-off position, the convex portion 96 of the second dog clutch 94 is disengaged from the first engagement 95A of the intermediate ring 93, and is disposed between the first engagement 95A and the second engagement 95B (see FIG. 6). Thus, the second clutch 82 is switched from the second connection state to the second cut-off state. In the second cut-off state, rotation transmission between the intermediate ring 93 and the second shift slider 79 is cut off. The second clutch 82 being in the second cut-off state cuts off the power transmission of both the second transmission path 12 and the third transmission path 36.

When the second dog clutch 94 moves from the front cut-off position to the third connection position, each of the convex portions 96 of the second dog clutch 94 is fitted into the second engagement 95B of the intermediate ring 93. Thus, the second dog clutch 94 and the second engagement 95B are incorporated in the third transmission path 36, and, as a result, the third transmission path 36 is opened, and the second clutch 82 is in the third connection state (see FIG. 7). In the third connection state, the rotation of the propeller shaft 17 is transmitted to the output shaft of the electric motor 11 through the third transmission path 36 without generating slippage. In other words, the second clutch 82 being in the third connection state permits the power transmission of the third transmission path 36. In this state, the second dog clutch 94 does not engage with the first engagement 95A of the intermediate ring 93, and the power transmission of the second transmission path 12 is cut off.

When the second dog clutch 94 moves from the second connection position (see FIG. 5) to the rear cut-off position, the convex portion 96 of the second dog clutch 94 is disengaged rearwardly from the first engagement 95A of the intermediate ring 93 (see FIG. 8). Thus, the second clutch 82 is switched from the second connection state to the second cut-off state. In the second cut-off state, rotation transmission between the intermediate ring 93 and the second shift slider 79 is cut off. The second clutch 82 being in the second cut-off state cuts off the power transmission of both the second transmission path 12 and the third transmission path 36.

The shift actuator 57 moves the shift slider 65 in the front-rear direction in accordance with the operation of the operation lever 102 performed by the user, and moves the shift slider 65 to any one of an intermediate position (shown in FIG. 5), a front position (shown in FIG. 6), and a rear position (shown in FIG. 8). When the shift slider 65 moves in the front-rear direction, the first dog clutch 52 and the second dog clutch 94 also move in the front-rear direction.

When the operation lever 102 is located at a position between the second forward position F2 and the second reverse position R2 (see FIG. 3), the shift slider 65 is in the intermediate position. When the user tilts the operation lever 102 from the second forward position F2 to the third forward position F3 (see FIG. 3), the shift slider 65 is moved from the intermediate position to the front position. While the user is tilting the operation lever 102 to a more forward position than the third forward position F3 (see FIG. 3), the shift slider 65 is in the front position. When the user tilts the operation lever 102 from the second reverse position R2 to the third reverse position R3 (see FIG. 3), the shift slider 65 is moved from the intermediate position to the rear position. While the user is tilting the operation lever 102 to a more rearward position than the third reverse position R3 (see FIG. 3), the shift slider 65 is in the rear position.

In the intermediate position shown in FIG. 5, the first dog clutch 52 is located at the neutral position (the first cut-off position), and the second dog clutch 94 is located at the second connection position. Therefore, the first clutch 81 is in the first cut-off state, and the second clutch 82 is in the second connection state. The vessel propulsion apparatus 1 at this time is in the electric motor drive mode. In the shift slider 65, the through-hole 78A of the first shift slider 78 and the concave portion 79A of the second shift slider 79 match each other, and an outer peripheral surface of the first shift slider 78 around the through-hole 78A makes surface contact with the rear circumferential surface 17D of the propeller shaft 17. As a result, the connector 83 that has been fitted in the through-hole 78A is held down so as not to jut out from the through-hole 78A toward the rear circumferential surface 17D, and thus is fitted also in the concave portion 79A. Therefore, the first shift slider 78 and the second shift slider 79 are connected together so as to be movable together in the front-rear direction. The stepped portion 79B of the second shift slider 79 comes into contact with a front end of the first shift slider 78 from the front.

When the shift slider 65 moves from the intermediate position to the front position shown in FIG. 6, the first dog clutch 52 is located at the forward position (the first connection position), and the second dog clutch 94 is located at the front cut-off position (the second cut-off position). Therefore, the first clutch 81 is in the first connection state, and the second clutch 82 is in the second cut-off state. The vessel propulsion apparatus 1 at this time is in the engine drive mode. Additionally, when the first dog clutch 52 is located at the forward position and when the second dog clutch 94 is located at the front cut-off position, the through-hole 78A of the first shift slider 78 and the concave portion 79A of the second shift slider 79 move in a mutually engaged state, and face the tapered surface 17E of the propeller shaft 17. Therefore, the connector 83 fitted in the through-hole 78A juts out to the tapered surface 17E, and thus is disengaged from the concave portion 79A. Therefore, the first shift slider 78 and the second shift slider 79 are separated. The tapered surface 17E relatively moves in the front-rear direction with respect to the connector 83 in this way, and, as a result, the connector 83 is allowed to be disengaged from the concave portion 79A so as to separate the first shift slider 78 and the second shift slider 79. The first dog clutch 52 connected to the first shift slider 78 is engaged with the front gear 50 at the forward position, and, as a result, the first shift slider 78 cannot move any further.

When the shift slider 65 moves from the front position to the intermediate position, the first shift slider 78 and the second shift slider 79 move together by allowing the stepped portion 79B of the second shift slider 79 to rearwardly press the front end of the first shift slider 78. Therefore, the first clutch 81 is in the first cut-off state, and the second clutch 82 is in the second connection state. In that case, the connector 83 rearwardly passes on the tapered surface 17E of the propeller shaft 17 in a state in which the through-hole 78A of the first shift slider 78 and the concave portion 79A of the second shift slider 79 have been engaged together. Thus, the connector 83 is pushed into the concave portion 79A of the second shift slider 79 by the tapered surface 17E, and therefore the first shift slider 78 and the second shift slider 79 are connected again (see FIG. 5). The tapered surface 17E relatively moves in the front-rear direction with respect to the connector 83 in this way, and, as a result, when the through-hole 78A and the concave portion 79A are engaged with each other, the connector 83 is pushed into the concave portion 79A, and the first shift slider 78 and the second shift slider 79 are connected together.

When the user further tilts the operation lever 102 forwardly from the fourth forward position F4 (see FIG. 3), the shift actuator 57 forwardly moves only the second shift slider 79 in a state in which the shift slider 65 is in the front position, and moves the second shift slider 79 to a draw-out position shown in FIG. 7. Thus, the second dog clutch 94 is located at the third connection position in a state in which the first dog clutch 52 remains in the forward position. Therefore, the first clutch 81 remains in the first connection state, and the second clutch 82 is in the third connection state. The vessel propulsion apparatus 1 at this time is in the engine-drive-plus-electric-motor-generation mode. When the engine 8 operates, the power of the engine 8 rotates the propeller shaft 17 through the first transmission path 9. Furthermore, a portion of the power of the engine 8 is transmitted to the electric motor 11 by the third transmission path 36. Thus, the electric motor 11 rotates and generates electricity. The battery B1 (see FIG. 2) connected to the electric motor 11 is charged with electric power generated by the electric motor 11.

When the user tilts the operation lever 102 from the fourth forward position F4 toward the third forward position F3 (see FIG. 3), the shift actuator 57 rearwardly moves the second shift slider 79 located at the draw-out position. Thus, the second dog clutch 94 is located at the front cut-off position, and the through-hole 78A of the first shift slider 78 and the concave portion 79A of the second shift slider 79 are engaged together (see FIG. 6). When the shift actuator 57 further rearwardly moves the second shift slider 79, the shift slider 65 is located at the intermediate position (see FIG. 5).

The shift slider 65 moves from the intermediate position to the rear position shown in FIG. 8 in a state in which the first shift slider 78 and the second shift slider 79 have been connected together. Thereupon, the first dog clutch 52 is located at the reverse position (the first connection position), and the second dog clutch 94 is located at the rear cut-off position (the second cut-off position). Therefore, the first clutch 81 is in the first connection state, and the second clutch 82 is in the second cut-off state.

As described above, the shift device 19 including the shift actuator 57 switches the first clutch 81 from the first cut-off state to the first connection state, and switches the second clutch 82 from the second connection state to the second cut-off state (see FIG. 5, FIG. 6, and FIG. 8). Additionally, the shift device 19 maintains the first connection state of the first clutch 81, and switches the second clutch 82 between the second cut-off state and the third connection state (see FIG. 6 and FIG. 7). Additionally, the shift device 19 switches the first clutch 81 from the first connection state to the first cut-off state, and switches the second clutch 82 from the second cut-off state to the second connection state (see FIG. 5, FIG. 6, and FIG. 8).

As described above, according to the structural arrangement of the present preferred embodiment, the electric motor 11 and the second transmission path 12 are housed in the lower case 24 of the outboard motor 3, and it is possible to perform power switching by using the existing forward-reverse switching mechanism 16 and the existing shift device 19. More specifically, it is possible to perform power switching between the engine 8 and the electric motor 11 or to allow the electric motor 11 to generate electricity in accordance with the forward-rearward movement of the shared shift slider 65 in the shift device 19. Therefore, in the hybrid type vessel propulsion apparatus 1, it is possible to achieve power switching or power generation of the electric motor 11 by use of a small-sized, lightweight, and simple arrangement without changing the basic structure and the size of the outboard motor 3.

In the present preferred embodiment, when the power of the engine 8 is transmitted to the propeller shaft 17 by the first transmission path 9, the hybrid type vessel propulsion apparatus 1 is in the engine drive mode, and the propeller shaft 17 is rotated by the power of the engine 8 (see FIG. 6 and FIG. 8). When the power of the electric motor 11 is transmitted to the propeller shaft 17 by the second transmission path 12, the vessel propulsion apparatus 1 is in the electric motor drive mode, and the propeller shaft 17 is rotated by the power of the electric motor 11 (see FIG. 5). When a portion of the power of the engine 8 transmitted from the first transmission path 9 to the propeller shaft 17 is transmitted to the electric motor 11 through the third transmission path 36, the hybrid type vessel propulsion apparatus 1 is in the engine-drive-plus-electric-motor-generation mode. In a state in which the hybrid type vessel propulsion apparatus 1 is in the engine-drive-plus-electric-motor-generation mode, the power of the engine 8 enables the propeller shaft 17 to rotate, and enables the electric motor 11 to generate electricity (see FIG. 7). The electric power generated by the electric motor 11 at this time has a higher voltage than the electric power generated by the above-described existing electric distribution system, and is used to operate the electric motor 11 in the subsequent electric motor drive mode. In other words, the electric motor 11 that rotates the propeller 18 generates its own operational power. This makes it possible to provide the operational power of the electric motor 11 without making a major structural change in the above-described existing electric distribution system.

In the present preferred embodiment, the vessel propulsion apparatus 1 includes the battery B1 that supplies operational power to the electric motor 11. In the engine-drive-plus-electric-motor-generation mode, the battery B1 is charged with electric power generated by the electric motor 11. Therefore, it is possible to store the operational power of the electric motor 11 in the battery B1 without making a major structural change in the existing electric distribution system. In this case, all that is required is to add wiring by which the battery B1 and the electric motor 11 are connected together, an inverter that converts a direct current of the battery B1 into an alternating current for the electric motor 11, and a REC/REG that converts an alternating current of the electric motor 11 for the battery B1 or rectifies a current direction.

In the present preferred embodiment, the first clutch 81 is switched between the first cut-off state and the first connection state, and the second clutch 82 is switched between the second cut-off state, the second connection state, and the third connection state. This makes it possible to switch the mode of the vessel propulsion apparatus 1 between the electric motor drive mode, the engine drive mode, and the engine-drive-plus-electric-motor-generation mode.

In the present preferred embodiment, when the first dog clutch 52 of the first clutch 81 moves between the first cut-off position and the first connection position, the first clutch 81 is switched between the first cut-off state and the first connection state. When the second dog clutch 94 of the second clutch 82 moves between the second cut-off position, the second connection position, and the third connection position, the second clutch 82 is switched between the second cut-off state, the second connection state, and the third connection state. The first shift slider 78 supporting the first dog clutch 52 and the second shift slider 79 supporting the second dog clutch 94 move in a state of being mutually connected by the connector-disconnector 80. This makes it possible to move the first dog clutch 52 between the first cut-off position and the first connection position and to move the second dog clutch 94 between the second connection position and the second cut-off position (see FIG. 5, FIG. 6, and FIG. 8). Therefore, it is possible to switch the mode of the vessel propulsion apparatus 1 between the electric motor drive mode and the engine drive mode. Only the second shift slider 79 moves when the first shift slider 78 and the second shift slider 79 are disconnected from each other by the connector-disconnector 80 in a state in which the first dog clutch 52 is in the first connection position. This makes it possible to move the second dog clutch 94 between the second cut-off position and the third connection position (see FIG. 6 and FIG. 7). Therefore, it is possible to switch the mode of the vessel propulsion apparatus 1 between the engine drive mode and the engine-drive-plus-electric-motor-generation mode.

The connector 83 fitted in the through-hole 78A of the first shift slider 78 is pushed into the concave portion 79A of the second shift slider 79 or is disengaged from the concave portion 79A in accordance with a relative movement of the tapered surface 17E of the propeller shaft 17 with respect to the connector 83. This makes it possible to achieve the connection and disconnection between the first shift slider 78 and the second shift slider 79 that are performed by the connector-disconnector 80.

In the present preferred embodiment, the engagement 95 is divided into the first engagement 95A and the second engagement 95B. When the second dog clutch 94 engages with the first engagement 95A at the second connection position, the vessel propulsion apparatus 1 is in the electric motor drive mode (see FIG. 5). When the second dog clutch 94 is located at a position between the second connection position and the third connection position and when the second dog clutch 94 does not engage with each of the first and second engagements 95A and 95B, the vessel propulsion apparatus 1 is in the engine drive mode (see FIG. 6). When the second dog clutch 94 engages with the second engagement 95B at the third connection position, the vessel propulsion apparatus 1 is in the engine-drive-plus-electric-motor-generation mode (see FIG. 7). The second dog clutch 94 moves from the second connection position to the third connection position, and, as a result, it is possible to switch the mode of the vessel propulsion apparatus 1 in the order of the electric motor drive mode, the engine drive mode, and the engine-drive-plus-electric-motor-generation mode with excellent responsibility.

Second Preferred Embodiment

FIG. 9 to FIG. 12 are cross-sectional views, each showing a portion of a vertical cross section of the lower unit of the outboard motor 3 in the vessel propulsion apparatus 1 according to a second preferred embodiment of the present invention. In the second preferred embodiment, the same reference numeral is given to a component that is functionally identical with that of the first preferred embodiment described above, and a detailed description of the same component is omitted (the same applies to a third preferred embodiment described below).

In the second preferred embodiment, the engagement 95 disposed in the intermediate ring 93 is not divided into the first engagement 95A and the second engagement 95B. A rear portion of the engagement 95 corresponds to the first engagement 95A, and a front portion of the engagement 95 corresponds to the second engagement 95B. In the second preferred embodiment, the number of the engagements 95 is one, and therefore the engagement 95 is more easily molded than in a case in which a plurality of engagements are provided as in the first preferred embodiment.

Figure 9:
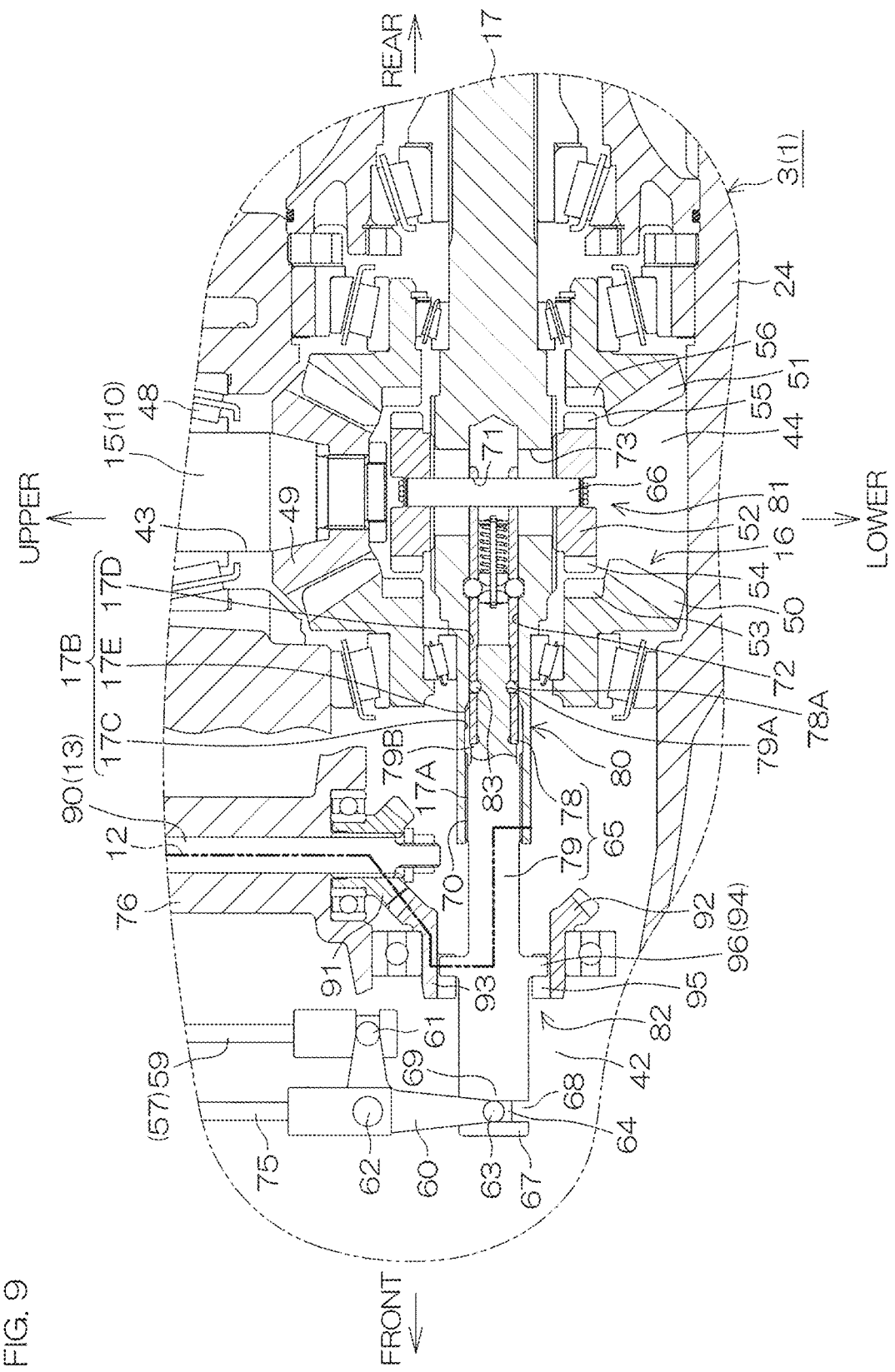
FIG. 9 is a cross-sectional view showing a portion of a vertical cross section of a lower unit according to a second preferred embodiment of the present invention.

When the shift slider 65 is in the intermediate position, the first dog clutch 52 is located at the neutral position (the first cut-off position), and the second dog clutch 94 is located at the second connection position, thus engaging with the rear portion of the engagement 95 of the intermediate ring 93 as shown in FIG. 9. At this time, the first clutch 81 is in the first cut-off state, and the second clutch 82 is in the second connection state, and therefore the vessel propulsion apparatus 1 is in the electric motor drive mode. In the shift slider 65, the first shift slider 78 and the second shift slider 79 are connected together.

Figure 10:
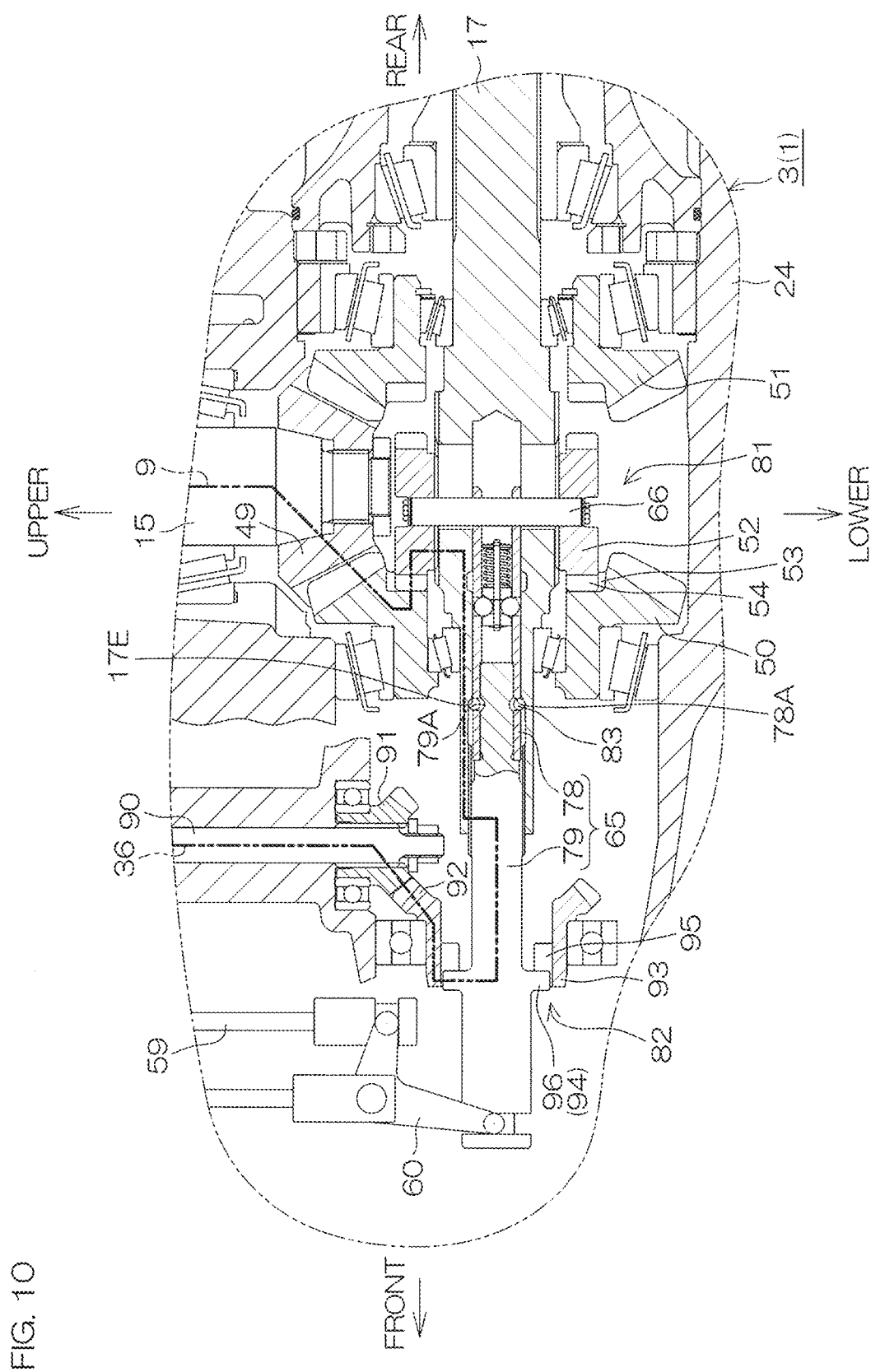
FIG. 10 is a cross-sectional view showing a portion of a vertical cross section of the lower unit according to the second preferred embodiment of the present invention.

When the shift slider 65 moves from the intermediate position to the front position shown in FIG. 10, the first dog clutch 52 is located at the forward position (the first connection position), and the second dog clutch 94 is located at the third connection position, thus engaging with the front portion of the engagement 95 of the intermediate ring 93. Thus, the first clutch 81 is in the first connection state, and the second clutch 82 is in the third connection state, and therefore the vessel propulsion apparatus 1 is in the engine-drive-plus-electric-motor-generation mode. Additionally, the first shift slider 78 and the second shift slider 79 are separated. When the shift slider 65 returns from the front position to the intermediate position, the first shift slider 78 and the second shift slider 79 are connected together as described above.

As described above, the engagement 95 according to the second preferred embodiment engages with the second dog clutch 94 being in the second connection position and in the third connection position, and rotates together with the second driven gear 92 and the intermediate ring 93 (see FIG. 9 and FIG. 10).

Figure 11:
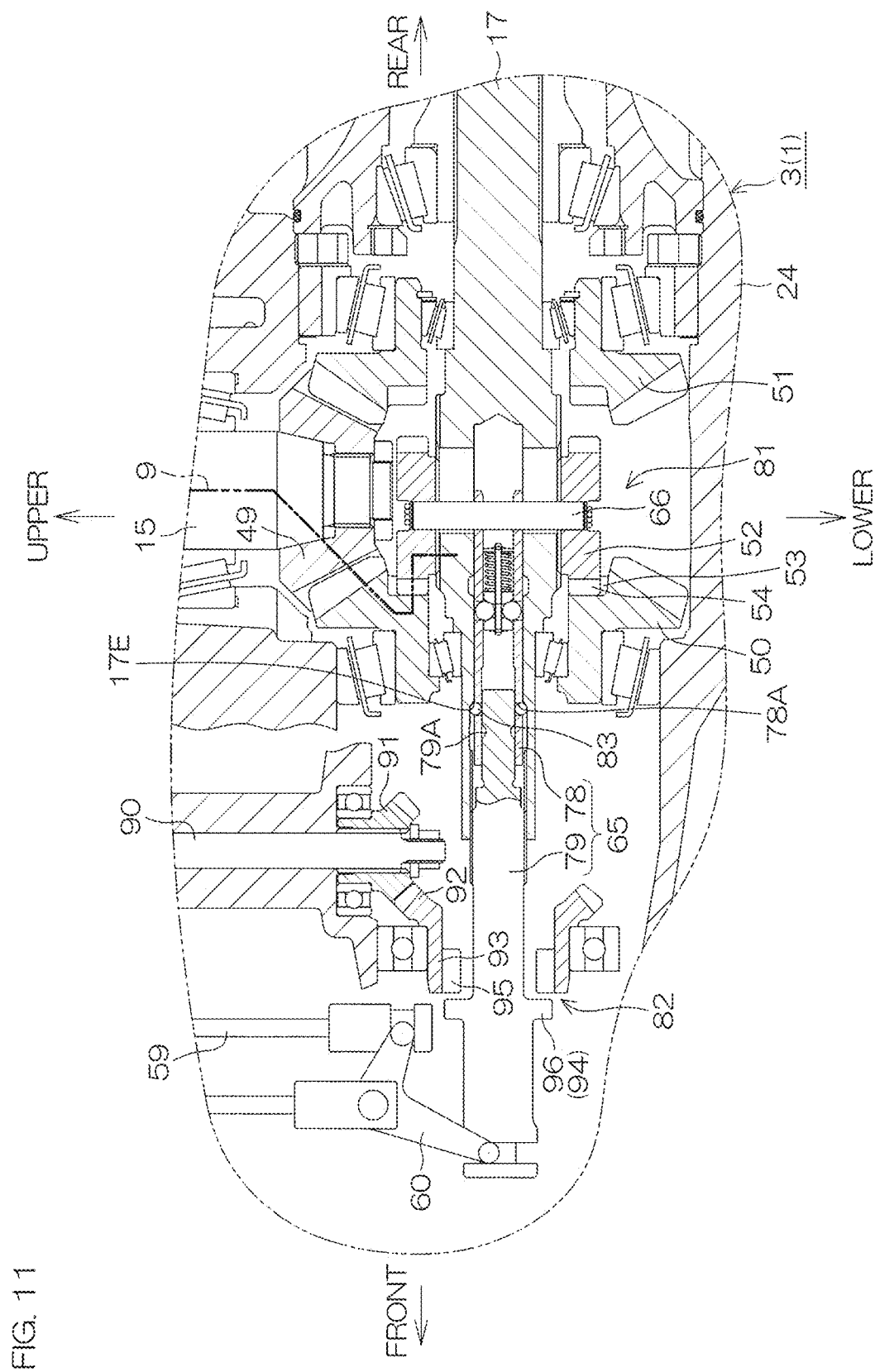
FIG. 11 is a cross-sectional view showing a portion of a vertical cross section of the lower unit according to the second preferred embodiment of the present invention.

Only the second shift slider 79 proceeds and moves to the draw-out position shown in FIG. 11 in a state in which the shift slider 65 is in the front position. Thereupon, the first dog clutch 52 is continuously located at the forward position, and the second dog clutch 94 moves forwardly from the engagement 95 of the intermediate ring 93, and is located at the front cut-off position (the second cut-off position). Thus, the first clutch 81 is continuously in the first connection state, and, on the other hand, the second clutch 82 is in the second cut-off state, and therefore the vessel propulsion apparatus 1 is in the engine drive mode.

Figure 12:
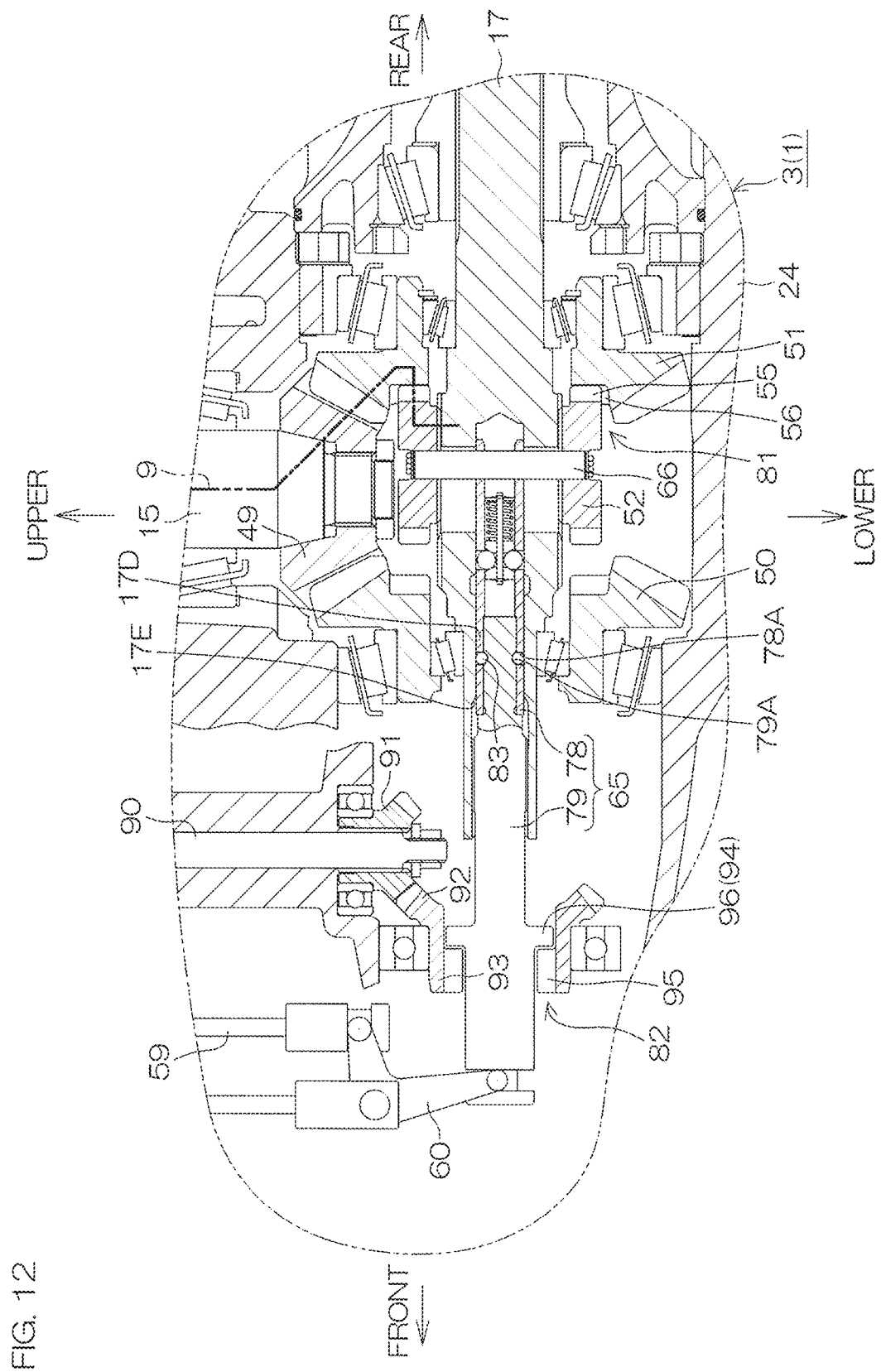
FIG. 12 is a cross-sectional view showing a portion of a vertical cross section of the lower unit according to the second preferred embodiment of the present invention.

When the shift slider 65 moves from the intermediate position to the rear position shown in FIG. 12, the first dog clutch 52 is located at the reverse position (the first connection position), and the second dog clutch 94 moves rearwardly from the engagement 95 of the intermediate ring 93, and is located at the rear cut-off position (the second cut-off position). Thus, the first clutch 81 is in the first connection state, and the second clutch 82 is in the second cut-off state, and therefore the vessel propulsion apparatus 1 is in the engine drive mode.

When the user forwardly tilts the operation lever 102, the vessel propulsion apparatus 1 is switched in the order of the electric motor drive mode, the engine drive mode, and the engine-drive-plus-electric-motor-generation mode in the first preferred embodiment (see FIG. 5 to FIG. 7). On the other hand, in the second preferred embodiment, when the operation lever 102 is tilted forwardly, the vessel propulsion apparatus 1 is switched in the order of the electric motor drive mode, the engine-drive-plus-electric-motor-generation mode, and the engine drive mode (see FIG. 9 to FIG. 11). In other words, in the first and second preferred embodiments, switching between the engine drive mode and the engine-drive-plus-electric-motor-generation mode is performed in reverse order, and yet other structural arrangements are substantially the same in both preferred embodiments.

Third Preferred Embodiment

Figure 13:
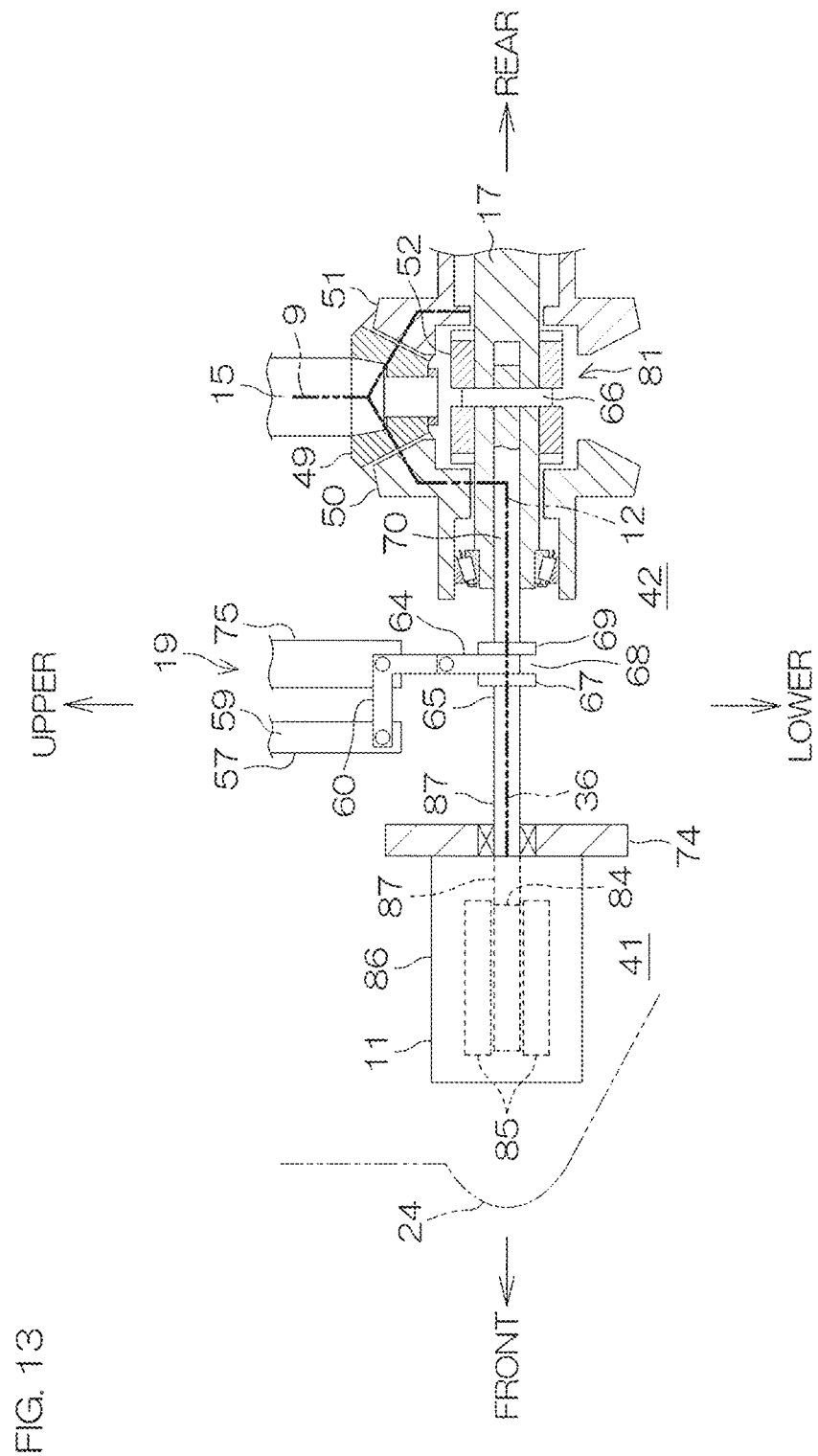
FIG. 13 is a cross-sectional view showing a portion of a vertical cross section of a lower unit according to a third preferred embodiment of the present invention.

FIG. 13 is a cross-sectional view showing a portion of a vertical cross section of the lower unit of the outboard motor 3 in the vessel propulsion apparatus 1 according to a third preferred embodiment of the present invention. FIG. 13 shows a state in which the first dog clutch 52 is located at the neutral position. The electric motor 11 is disposed in front of the propeller shaft 17 and the shift slider 65. The electric motor 11 is located at a more forward position than the shift actuator 57. The electric motor 11 includes a rotor 84 that is disposed coaxially with the propeller shaft 17 and that is rotatable, a stator 85 by which the rotor 84 generates a rotational torque, and a motor housing 86 that houses the rotor 84 and the stator 85. When operational power is supplied from the battery B1 to the electric motor 11, the rotor 84 rotates. The motor chamber 41 housing the electric motor 11 is located in front of the shift chamber 42. The motor chamber 41 is separated from the shift chamber 42 by a spacer 74.

The electric motor 11 additionally includes an output shaft 87 that protrudes rearwardly from a rear end of the rotor 84 and that passes through the motor housing 86 and the spacer 74. The output shaft 87 is supported by the spacer 74, and is rotatable together with the rotor 84. In the third preferred embodiment, the second clutch 82 is excluded, and the shift slider 65 is not divided into the first shift slider 78 and the second shift slider 79. Therefore, a rear end of the output shaft 87 is fixed to a front end of the shift slider 65. A joint may be interposed between the shift slider 65 and the output shaft 87. The rotor 84 and the output shaft 87 are relatively movable in the front-rear direction with respect to the stator 85 by moving the rotor 84 and the output shaft 87 back and forth together with the shift slider 65.

In the third preferred embodiment, the second transmission path 12 also defines the third transmission path 36. When the vessel propulsion apparatus 1 is in the electric motor drive mode, the first dog clutch 52 is located at the neutral position. At this time, the electric motor 11 rotates the output shaft 87, and, as a result, the shift slider 65 and the propeller shaft 17 rotate in the same rotation direction at the same rotation speed as the output shaft 87. Thereafter, when the vessel operator operates the operation lever 102 and moves the first dog clutch 52 to the forward position, the shift slider 65 moves in accordance with this shift operation. Thus, the rotor 84 and the output shaft 87 deviate forwardly. Thus, the vessel propulsion apparatus 1 is switched from the electric motor drive mode to the engine-drive-plus-electric-motor-generation mode. Therefore, the electric motor 11 generates electricity while the propeller shaft 17 is rotating by the power of the engine 8.

On the other hand, when the vessel operator operates the operation lever 102 toward the original position, the rotor 84 and the output shaft 87 move to the original position together with the shift slider 65. Thus, the vessel propulsion apparatus 1 is switched from the engine-drive-plus-electric-motor-generation mode to the electric motor drive mode.

The shift actuator 57 that moves the shift slider 65 is an example of an actuator. The shift actuator 57 changes the relative position of both the rotor 84 and the stator 85 in the front-rear direction in accordance with the shift operation of the vessel operator.

In the third preferred embodiment, the following actions and effects are achieved in addition to the actions and effects according to the first preferred embodiment. More specifically, a change in magnetic flux density of the electric motor 11 is caused by a change in the relative position between the rotor 84, which transmits power to and from the propeller shaft 17, and the stator 85. When the vessel propulsion apparatus 1 is in the electric motor drive mode, a region in which the rotor 84 and the stator 85 overlap with each other in the front-rear direction is comparatively wide, and therefore the magnetic flux density is high. Therefore, it is possible to generate a high torque in the electric motor 11 when the propeller shaft 17 rotates at a low speed in the electric motor drive mode. When the vessel propulsion apparatus 1 is in the engine-drive-plus-electric-motor-generation mode, the rotor 84 deviates forwardly from the stator 85, and, as a result, the region in which the rotor 84 and the stator 85 overlap with each other in the front-rear direction becomes narrow, and therefore the magnetic flux density is reduced. Therefore, when the propeller shaft 17 rotates at a high speed in the engine-drive-plus-electric-motor-generation mode, it is possible to prevent excessive power generation by significantly reducing or preventing an increase in the induced voltage of the electric motor 11.

For example, an actuator that moves the stator 85 back and forth in accordance with the control of the propulsion-apparatus ECU 31 may be provided. As an example, the number of rotations of the engine 8 serves as an indicator of the operational amount of the operation lever 102 performed by the user. The propulsion-apparatus ECU 31 monitors the number of rotations of the engine 8 detected by the speed sensor 34 (see FIG. 2). In the engine-drive-plus-electric-motor-generation mode, the propulsion-apparatus ECU 31 commands the actuator to separate the stator 85 from the rotor 84 when the number of rotations of the engine 8 exceeds a predetermined threshold value. Thus, the propeller shaft 17 continues to rotate by the power of the engine 8, and, meanwhile, the magnetic flux density is further reduced, and the electric motor 11 stops power generation. Thus, the vessel propulsion apparatus 1 is switched from the engine-drive-plus-electric-motor-generation mode to the engine drive mode. Therefore, it is possible to more reliably prevent excessive power generation of the electric motor 11.

Normally, the electric motor 11 is longer in the axial direction than in the radial direction. The output shaft 87 of the electric motor 11 extends in the axial direction of the electric motor 11. In the present preferred embodiment, the output shaft 87 of the electric motor 11 extends in the front-rear direction, and the axial direction of the electric motor 11 is parallel to the front-rear direction. In this case, it is possible to reduce the vessel propulsion apparatus 1 in size in the up-down direction than in a case in which the output shaft 87 of the electric motor 11 extends in the up-down direction. Additionally, during ordinary use, the electric motor 11 is located at a lower position than the water surface, and, as a result, it becomes difficult for the operating noise of the electric motor 11 to reach the user, and therefore it is possible to improve quietness.

In the third preferred embodiment, the output shaft 87 of the electric motor 11 not only extends in the front-rear direction but also is coaxial with the propeller shaft 17. Therefore, it is possible to make both the second transmission path 12 and the third transmission path 36 shorter in distance than in a case in which the output shaft 87 of the electric motor 11 is not coaxial with the propeller shaft 17. This makes it possible to reduce power loss caused in the second transmission path 12 and in the third transmission path 36, and makes it possible to raise the transmission efficiency of power transmitted between the electric motor 11 and the propeller shaft 17.

Although preferred embodiments of the present invention have been described above, the present invention is not restricted to the contents of these preferred embodiments and various modifications are possible within the scope of the present invention.

The first forward position F1 and the first reverse position R1 (see FIG. 3) may be excluded, and, if so, a dead zone between the first forward position F1 and the first reverse position R1 is excluded.

In the second transmission member 13, the deceleration mechanism that decelerates and transmits the rotation of the electric motor 11 may be excluded. If so, the above-described intermediate shaft 90 may be an output shaft of the electric motor 11.

Although the vessel propulsion apparatus 1 is in the engine-drive-plus-electric-motor-generation mode during forward traveling in the above-described preferred embodiments, the vessel propulsion apparatus 1 may be in the engine-drive-plus-electric-motor-generation mode during reverse traveling. The vessel propulsion apparatus 1 may be in the engine-drive-plus-electric-motor-generation mode both during forward traveling and during reverse traveling.

The shift device 19 may be a mechanical type (hydraulic type or cable type) that does not include the shift actuator 57.

The vessel propulsion apparatus 1 may include an inboard-outboard motor instead of the outboard motor 3.

Two or more of the features described in the first to third preferred embodiments and the features described in the above-described modifications may be combined together.

Also, features of two or more of the various preferred embodiments described above may be combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hybrid vessel propulsion apparatus comprising:
an engine;
an electric motor;
a propeller shaft that rotates together with a propeller;
a first transmission path that transmits power of the engine to the propeller shaft;
a second transmission path that transmits power of the electric motor to the propeller shaft without transmitting the power through the first transmission path;
a third transmission path that transmits a portion of the power of the engine that has been transmitted from the first transmission path to the propeller shaft to the electric motor in order for the electric motor to generate electricity;
a first clutch that includes a first cut-off state in which power transmission of the first transmission path is cut off and a first connection state in which the power transmission of the first transmission path is permitted; and
a second clutch that includes a second cut-off state in which both power transmission of the second transmission path and power transmission of the third transmission path are cut off, a second connection state in which the power transmission of the third transmission path is cut off and the power transmission of the second transmission path is permitted, and a third connection state in which the power transmission of the second transmission path is cut off and the power transmission of the third transmission path is permitted.

2. The hybrid vessel propulsion apparatus according to claim 1, further comprising a power source that supplies operational power to the electric motor and that is charged with electric power generated by the electric motor.

3. The hybrid vessel propulsion apparatus according to claim 1, further comprising:
a switch that performs switching in which the first clutch is switched from the first cut-off state to the first connection state and the second clutch is switched from the second connection state to the second cut-off state, or in which the second clutch is switched between the second cut-off state and the third connection state and the first connection state of the first clutch is being maintained, or in which the first clutch is switched from the first connection state to the first cut-off state and the second clutch is switched from the second cut-off state to the second connection state; wherein
the hybrid vessel propulsion apparatus is in an electric motor drive mode when the first clutch is in the first cut-off state and the second clutch is in the second connection state;
the hybrid vessel propulsion apparatus is in an engine drive mode when the first clutch is in the first connection state and the second clutch is in the second cut-off state; and
the hybrid vessel propulsion apparatus is in an engine-drive-plus-electric-motor-generation mode when the first clutch is in the first connection state and the second clutch is in the third connection state.

4. The hybrid vessel propulsion apparatus according to claim 3, wherein the first transmission path includes a first drive gear that rotates in accordance with rotation of the engine and a first driven gear that is rotationally driven by the first drive gear;
the first clutch includes a first dog clutch that is movable along an axial direction of the propeller shaft between a first cut-off position to be disengaged from the first driven gear and a first connection position to be engaged with the first driven gear;
the first clutch is in the first cut-off state when the first dog clutch is located at the first cut-off position, and the first clutch is in the first connection state when the first dog clutch is located at the first connection position;
the second transmission path and the third transmission path share an interlocking gear that rotates in accordance with rotation of the electric motor;
the second clutch includes a second dog clutch that is movable along the axial direction between a second cut-off position to be disengaged from the interlocking gear, a second connection position to be engaged with the interlocking gear, and a third connection position that differs from the second connection position and that is to be engaged with the interlocking gear;
the second clutch is in the second cut-off state when the second dog clutch is located at the second cut-off position, the second clutch is in the second connection state when the second dog clutch is located at the second connection position, and the second clutch is in the third connection state when the second dog clutch is located at the third connection position; and
the switch includes a first shift slider that supports the first dog clutch and that rotates together with the propeller shaft, a second shift slider that supports the second dog clutch and that rotates together with the propeller shaft, a connector-disconnector that connects the first shift slider and the second shift slider together or disconnects the first shift slider and the second shift slider from each other, and a shift actuator that moves the second shift slider in the axial direction.

5. The hybrid vessel propulsion apparatus according to claim 4, wherein
the propeller shaft has a tubular or substantially tubular shape, the first shift slider has a tubular or substantially tubular shape and extends into the propeller shaft, and the second shift slider extends into the first shift slider;
the connector-disconnector includes a tapered surface on an inner peripheral surface of the propeller shaft, a through-hole in a peripheral wall of the first shift slider, a concave portion on an outer peripheral surface of the second shift slider, and a connector fitted in the through-hole; and the tapered surface relatively moves in the axial direction with respect to the connector such that when the through-hole and the concave portion match with each other, the connector is pushed into the concave portion so that the first shift slider and the second shift slider are connected together, or the connector is permitted to be disconnected from the concave portion so that the first shift slider and the second shift slider are disconnected from each other.

6. The hybrid vessel propulsion apparatus according to claim 4, further comprising:
   a first engagement that defines a portion of the second transmission path when engaged with the second dog clutch when the second dog clutch is in the second connection position and that rotates together with the interlocking gear; and
   a second engagement that is different from the first engagement, that defines a portion of the third transmission path when engaged with the second dog clutch when the second dog clutch is in the third connection position, and that rotates together with the interlocking gear.

7. The hybrid vessel propulsion apparatus according to claim 4, further comprising an engagement that engages with the second dog clutch when the second dog clutch is in the second connection position and in the third connection position and that rotates together with the interlocking gear.

* * * * *